(12) United States Patent
Wexler et al.

(10) Patent No.: US 10,318,575 B2
(45) Date of Patent: Jun. 11, 2019

(54) SYSTEMS AND METHODS OF BUILDING AND USING AN IMAGE CATALOG

(71) Applicant: Zorroa Corporation, Berkeley, CA (US)

(72) Inventors: Daniel Elliott Wexler, Soda Springs, CA (US); Juan Jose Buhler, Woodside, CA (US)

(73) Assignee: Zorroa Corporation, Berkeley, CA (US)

( * ) Notice: Subject to any disclaimer, the term of this patent is extended or adjusted under 35 U.S.C. 154(b) by 562 days.

(21) Appl. No.: 14/941,502

(22) Filed: Nov. 13, 2015

(65) Prior Publication Data

US 2016/0140146 A1    May 19, 2016

Related U.S. Application Data

(60) Provisional application No. 62/080,198, filed on Nov. 14, 2014.

(51) Int. Cl.
*G06F 16/00*    (2019.01)
*G06F 16/583*    (2019.01)
(Continued)

(52) U.S. Cl.
CPC .......... *G06F 16/5838* (2019.01); *G06F 16/50* (2019.01); *G06F 16/51* (2019.01);
(Continued)

(58) Field of Classification Search
None
See application file for complete search history.

(56) References Cited

U.S. PATENT DOCUMENTS 6,035,055 A      3/2000  Wang et al.
2003/0236752 A1*  12/2003  Dawson ................. G06Q 30/06
                                              705/54
(Continued)

FOREIGN PATENT DOCUMENTS

WO    WO2012/030586 A1    3/2012

OTHER PUBLICATIONS

Zorroa Corporation, International Search Report and Written Opinion, PCT/US2015/060922, dated Mar. 9, 2016, 9 pgs.
(Continued)

*Primary Examiner* — Son T Hoang
(74) *Attorney, Agent, or Firm* — Morgan, Lewis & Bockius LLP

(57) ABSTRACT

A method of managing an image catalog is performed by one or more servers. The process receives from a first user identification of one or more images in an image database. The image database is distinct from the servers. For each of the images, the process analyzes the image to extract keywords that describe the image and creates an index entry in the image catalog. The index entry includes the keywords. The process receives a query from a second user and matches the query to an index entry in the image catalog. The index entry corresponds to a first image in the image database. The process determines whether the second user is authorized to view the first image. When the second user is authorized to view the first image, the process retrieves the first image from the image database and transmits the first image to the second user.

20 Claims, 15 Drawing Sheets

(51) Int. Cl.
*G06F 16/51* (2019.01)
*G06F 16/58* (2019.01)
*G06K 9/00* (2006.01)
*G06K 9/18* (2006.01)
*G06K 9/46* (2006.01)
*G06F 16/50* (2019.01)

(52) U.S. Cl.
CPC ...... *G06F 16/5846* (2019.01); *G06F 16/5854* (2019.01); *G06F 16/5866* (2019.01); *G06K 9/00288* (2013.01); *G06K 9/00362* (2013.01); *G06K 9/18* (2013.01); *G06K 9/4604* (2013.01)

(56) References Cited

U.S. PATENT DOCUMENTS

| | | | |
|---|---|---|---|
| 2004/0070678 | A1 | 4/2004 | Toyama et al. |
| 2005/0154754 | A1 | 7/2005 | Sheldon et al. |
| 2005/0160079 | A1 | 7/2005 | Turski et al. |
| 2007/0273702 | A1* | 11/2007 | Ishii ............ G06F 3/14 345/557 |
| 2008/0304808 | A1* | 12/2008 | Newell ......... G06F 17/30029 386/278 |
| 2009/0009493 | A1 | 1/2009 | Hong |
| 2009/0106271 | A1* | 4/2009 | Chieu ........... G06F 17/30634 |
| 2009/0157638 | A1 | 6/2009 | Flynn et al. |
| 2009/0164946 | A1 | 6/2009 | Liddington |
| 2009/0203368 | A1 | 8/2009 | Marsyla et al. |
| 2009/0208116 | A1 | 8/2009 | Gokturk et al. |
| 2011/0022394 | A1* | 1/2011 | Wide ............ G06K 9/00718 704/270 |
| 2011/0047163 | A1* | 2/2011 | Chechik ........ G06F 17/30781 707/741 |
| 2011/0145232 | A1 | 6/2011 | Chang et al. |
| 2012/0304247 | A1 | 11/2012 | Badger |
| 2015/0016700 | A1 | 1/2015 | Drozdzal et al. |
| 2015/0296228 | A1* | 10/2015 | Chen ............ G06F 17/30029 725/34 |
| 2015/0347505 | A1 | 12/2015 | Ohashi et al. |
| 2016/0065547 | A1* | 3/2016 | Heinrich ....... G06F 17/30091 713/171 |

OTHER PUBLICATIONS

Buhler, Office Action, U.S. Appl. No. 15/232,769, dated Jul. 13, 2018, 14 pgs.

Tang, "Exploring Video Streams Using Slit-Tear Visualization," Tang et al. 2008, from: http://grouplab.cpsc.ucalgary.ca/grouplab/uploads/Publications/Publications/2008-SlitTear.AVI.pdf, all pages.

Zorroa Corporation, International Preliminary Report on Patentability, PCT/US2015/060922, dated May 16, 2017, 6 pgs.

Wexler, Office Action, U.S. Appl. No. 15/232,759, dated May 17, 2018, 11 pgs.

Buhler, Office Action, U.S. Appl. No. 15/232,769, dated Nov. 29, 2018, 17 pgs.

Wexler, Final Office Action, U.S. Appl. No. 15/232,759, dated Nov. 8, 2018, 14 pgs.

* cited by examiner

510

522

SYSTEMS AND METHODS OF BUILDING AND USING AN IMAGE CATALOG

CROSS REFERENCE TO RELATED APPLICATIONS

This application claims priority to U.S. Provisional Patent Application No. 62/080,198, "Systems and Methods of Building and Using an Image Catalog," filed Nov. 14, 2014, which is hereby incorporated by reference in its entirety.

TECHNICAL FIELD

The disclosed implementations relate generally to digital image applications, and more particularly, to a digital image system for cataloging images from multiple sources and using the catalog for discovering and viewing images.

BACKGROUND

Image collections are growing in size and are often in multiple locations. Image repositories may exist on local storage for mobile and desktop devices, dedicated network-attached storage (NAS), or on remote cloud services. Often images are duplicated and stored in multiple repositories because of the requirements of legacy tools that each want copies of your data in order to do their work. Social services, such as Facebook, Google+, and Twitter, are some of the largest cloud image repositories. It is becoming increasingly difficult to know the location and history of a given image. Without adequate location and history information of images, it is also difficult to conduct searches and provide an intuitive visualization of search results. Conventional methods attempt to move images into a central location and perform searches against the pooled images. These conventional methods are inefficient and create security risks. For example, moving image data creates risk in transit and exposes additional copies of the images to misappropriation.

SUMMARY

Disclosed implementations address the above deficiencies and other problems associated with managing images. The present disclosure is directed towards a system that provides visual insight, discovery, and navigation into collections of millions of images stored in multiple locations without needing to change a user's workflow. Search across the user's entire portfolio using keywords and semantic information automatically extracted from the user's photos. In some implementations, the "asset-light" model does not move the user's image data (the actual "pixels") from the cloud or local storage. The system thus allows exploring the user's images to quickly finding exactly what the user needs wherever the full-resolution images live. The system further visualizes the user's entire portfolio by graphing information about all of the user's images. In addition, the system uses statistical data to provide business intelligence to bring value to the user's entire portfolio of images.

Some implementations provide simple and intuitive interfaces. By leveraging leading-edge image processing and vision tools, the system lets users perform simple searches and generate gorgeous, interactive graphical representations of the users' data. Some implementations apply the latest Computer Vision algorithms to images in order to extract metadata from the images. Such Computer Vision algorithms may include: a Deep Convolutional Neural Network to extract keywords; Optical Character Recognition to extract text, jersey numbers, signs, logos, and other character-based information; Facial Recognition to match faces to names; Color Analysis and structural information (SIFT) from the images to identify cropped and modified (Template Matching) images to track duplicates and variations of images after processing. The system extracts the existing metadata for each image, including its origin, dates, and statistical information. The system then compresses the metadata along with a deep image analysis and stores this data in a compact database designed to enable fast searches through truly enormous image collections consisting of millions of individual images.

Some implementations include an image catalog that is orders of magnitude smaller than the actual images. By decoupling the search data from the geometrically expanding storage requirements for actual images and video data, the lightweight structure provides a computational layer that represents all user images. Unlike other services, which force users to relocate their images, a system according to implementations of the present disclosure lets the images stay where they are now, avoiding changes to the existing workflows and providing access to all the images in users' entire organization, rather than just the ones relocated to a particular cloud service. Since the actual image data is not required to move from its original location, the present disclosure provides a more secure environment, especially because everything is encrypted and secured.

As noted above, image collections are growing in size and are often in multiple locations. It is becoming increasingly difficult to know all of the locations and history of a given image. The present disclosure addresses this problem and allows users to manage the growing image collection complexity by indexing all of the users' image portfolios, finding duplicates and treating them as different versions of the same original image. Image analysis can even identify many image modifications, including color adjustments and cropping, provide an image history that shows all the variations and locations of a given image across all of the users' image collections and social services.

Systems, methods, devices, and non-transitory computer readable storage media for building and using an image catalog are disclosed. In some implementations, a method of managing an image catalog is performed by one or more servers, each having one or more processors and memory. The method includes receiving from a first user identification of one or more images in a first image database. The first image database is distinct from the one or more servers. For each image of the one or more images, the method analyzes the respective image to extract respective keywords that describe the respective image and creates a respective index entry in the image catalog. The respective index entry includes the respective keywords. The method subsequently receives a query from a second user and matches the query to one or more first index entries in the image catalog. The first index entry corresponds to a respective first image in the first image database. The method determines whether the second user is authorized to view the first images. When the second user is authorized to view one or more of the first images, the method retrieves the corresponding first images from the first image database and transmits the retrieved first images to the second user.

In some implementations, analyzing the respective image to extract respective keywords includes performing deep convolutional neural network semantic analysis on the respective image. In some implementations, the first user specifies a subject matter for the one or more identified images, and the deep convolutional neural network semantic analysis uses a neural network trained on images corresponding to the specified subject matter.

In some implementations, analyzing the respective image to extract respective keywords includes using optical character recognition (OCR), extracting a color palette for the respective image, identifying one or more known faces in the respective image, and/or identifying one or more known human bodies based on body features, among others.

In some implementations, for each image, the method further includes identifying metadata associated with the respective image. The respective metadata includes one or more of: date/time the respective image was created, location where the image was created, identification of a camera that took the respective image, and identification of camera attributes that took the respective image. The method stores the respective metadata as part of the respective index entry for the respective image.

In some implementations, a computer system for managing an image catalog includes one or more processors, memory, and one or more programs stored in the memory. The programs are configured for execution by the one or more processors. The programs include instructions for receiving from a first user identification of one or more images in a first image database. The first image database is distinct from the one or more servers. For each image of the one or more images, the programs analyze the respective image to extract respective keywords that describe the respective image and create a respective index entry in the image catalog. The respective index entry includes the respective keywords. The programs receive a query from a second user and match the query to a first index entry in the image catalog. The first index entry corresponds to a first image in the first image database. The programs determine whether the second user is authorized to view the first image. When the second user is authorized to view the first image the programs retrieve the first image from the first image database and transmit the first image to the second user.

In some implementations, a non-transitory computer readable storage medium stores one or more programs configured for execution by one or more processors of a computer system for managing an image catalog. The programs include instructions for receiving from a first user identification of one or more images in a first image database. The first image database is distinct from the one or more servers. For each image of the one or more images the programs analyze the respective image to extract respective keywords that describe the respective image and create a respective index entry in the image catalog. The respective index entry includes the respective keywords. The programs receive a query from a second user and match the query to a first index entry in the image catalog. The first index entry corresponds to a first image in the first image database. The programs determine whether the second user is authorized to view the first image. When the second user is authorized to view the first image the programs retrieve the first image from the first image database and transmit the first image to the second user.

BRIEF DESCRIPTION OF THE DRAWINGS

FIG. 7 is a process flow diagram illustrating a catalog transfer request in accordance with some implementations.

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Disclosed implementations enable users to build a catalog and use the catalog to provide visual insight, discovery and navigation into collections of millions of images stored in multiple locations without needing to change a user's workflow. In some implementations, the system includes at least two tools. The first one runs on the desktop and a second one runs on the desktop, mobile, and/or in browsers. The first curator tool is responsible for seeking out images from local and cloud storage, performing image analysis and uploading the results to an image catalog search database. The second viewer tool provides search, visualization, tagging, and delivery using the data stored in the image search database. Image requests for locally stored images are fulfilled asynchronously by the curator tool. Both the curator and viewer tools display notifications of changes or global system messages. Systems and devices implementing the curator and viewer tools in accordance with some implementations are illustrated in FIGS. 1-4.

Figure 1:
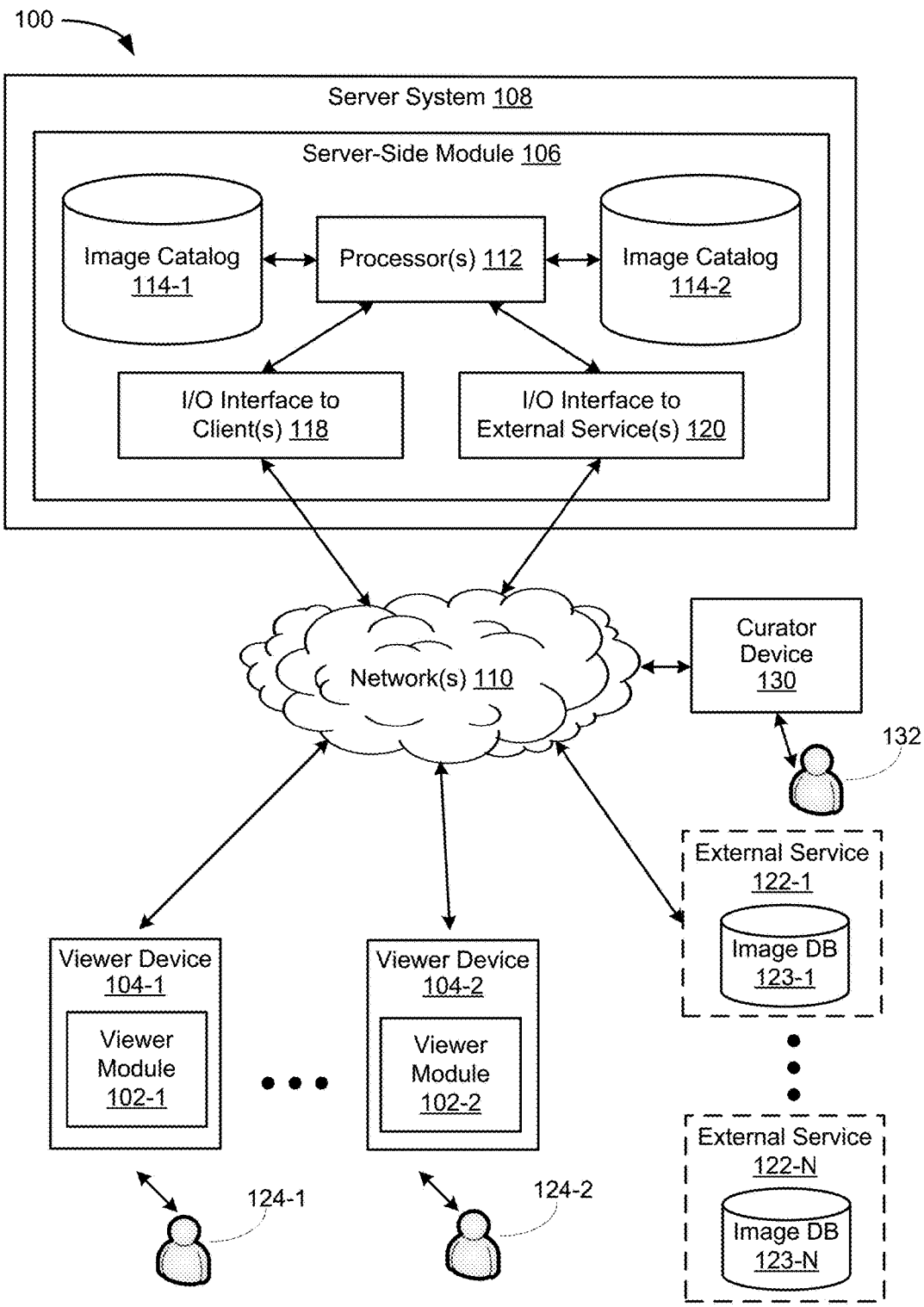
FIG. 1 is a block diagram of a computing system for managing an image catalog in accordance with some implementations.

FIG. 1 is a block diagram of a computer system 100 that enables users to build and use an image catalog in accordance with some implementations. In some implementations, the computer system 100 includes viewer device application (or "module") 102-1, 102-2 . . . executed on viewer devices 104-1, 104-2 . . . , at least one curator user device 130, and server-side software module 106 executed on a server system 108. A viewer module 102 communicates with a server-side module 106 through one or more networks 110. The viewer module 102 provides viewer functionality (e.g., search and view images) and communications with server-side module 106. The server-side module 106 provides server-side functionality (e.g., managing the image catalog 114 and handling requests to transfer images) for any number of viewer modules 102 each residing on a respective viewer device 104.

In some implementations, the viewer devices 104 are computing devices such as desktops, laptops, mobile devices, from which users 124 can browse the image catalog, discover images, and view images. The server 108 connects to the external services 122 to obtain the images in response to an image uploading request initiated from the curator device 130. The image uploading request may direct the curator device 130 to seek out images from local and cloud storage 123-1 . . . 123-N, performing image analysis and uploading the results to search database (e.g. server side image catalogs 114). The viewer modules 102 on the client device 130 can then provide search, visualization, tagging, and delivery using the data stored in the image catalog database 114. Image requests for locally stored images can be fulfilled asynchronously by the curator device 130. Both the curator device 130 and the viewer device 104 are capable of displaying notifications of changes or global system messages.

The computer system 100 shown in FIG. 1 includes both a client-side portion (e.g., the viewer module 102 and modules on the curator device 130) and a server-side portion (e.g., the server-side module 106). In some implementations, data processing is implemented as a standalone application installed on viewer device 104. In addition, the division of functionality between the client and server portions of client environment data processing can vary in different implementations. For example, in some implementations, the viewer module 102 is a thin-client that provides only image search requests and output processing functions, and delegates all other data processing functionality to a backend server (e.g., the server system 108). In some implementations, the curator device 130 delegates the image analysis function to a backend server (e.g., the server system 108).

The communication network(s) 110 can be any wired or wireless local area network (LAN) and/or wide area network (WAN), such as an intranet, an extranet, or the Internet. It is sufficient that the communication network 110 provides communication capability between the server system 108 and the clients 104, and the curator device 130.

In some implementations, the server-side module 106 includes one or more processors 112, one or more databases 114, an I/O interface to one or more clients 118, and an I/O interface to one or more external services 120. The I/O interface to one or more clients 118 facilitates the processing of input and output associated with the client devices and devices for server-side module 106. One or more processors 112 obtain images and information related to images from external services 122 in response to an upload request initiated by the device 130, process the images and the information, and store the image references along with the information in the image catalog 114. The image catalog database 114 stores various information, including but not limited to catalogs, images, image metadata, image information, geographic information, map information, among others. The image catalog 114 may also store a plurality of record entries relevant to the users associated with images. I/O interface to one or more external services 120 facilitates communications with one or more external services 122 (e.g., image repositories, social services, and/or other cloud image repositories).

In some implementations, the server-side module 106 connects to the external services 120 through the I/O interfaces 120 and obtain information such as images stored on the external services 120. After obtaining the images along with the information associated with the images, the server 108 processes the data retrieved from the external services 120 to extract information and catalog the images. The processed and/or the unprocessed information are stored in the image catalog 114, including but not limited to catalogs, images, image metadata, image information, geographic information, map information, among others. The database 114 may also store a plurality of record entries relevant to the users associated with location sharing, and short electronic messages exchanged among the users.

Examples of the viewer device 104 include, but are not limited to, a handheld computer, a wearable computing device, a personal digital assistant (PDA), a tablet computer, a laptop computer, a cellular telephone, a smart phone, an enhanced general packet radio service (EGPRS) mobile phone, a media player, a navigation device, a portable gaming device console, a tablet computer, a laptop computer, a desktop computer, or a combination of any two or more of these data processing devices or other data processing devices.

The viewer device 104 includes (e.g., is coupled to) a display and one or more input devices. The viewer device 104 receives inputs (e.g., messages, images) from the one or more input devices and outputs data corresponding to the inputs to the display for display to the user 124. The user 124 uses the viewer device 104 to transmit information (e.g., messages, images, and geographic location of the viewer device 104) to the server 108. The server 108 receives the information, processes the information, and sends processed information to the display of the viewer device 104 for display to the user 124.

Examples of the curator device 130 include, but are not limited to, a handheld computer, a tablet computer, a laptop computer, a desktop computer, a server computer, or other computing device with sufficient processing power to operate as a server, or a combination of any two or more of these data processing devices or other data processing devices. The curator device 130 includes (e.g., is coupled to) a display and one or more input devices in some implementations. The curator device 130 receives inputs (e.g., requests to upload or retrieve images) from the one or more input devices and outputs data corresponding to the inputs to the display for display to the user 132. The user 132 uses the curator device 130 to transmit information (e.g., requests to upload, search, and retrieve images) to the server 108. The server 108 receives the information, processes the information, and sends processed information (e.g., uploading status, search results) to the display of the device 130 for display to the user 132.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 is implemented on one or more standalone data processing apparatuses or a distributed network of computers. In some implementations, the server system 108 also employs various virtual devices and/or services of third party service providers (e.g., third-party cloud service providers) to provide the underlying computing resources and/or infrastructure resources of the server system 108.

The computer system 100 shown in FIG. 1 includes both a client-side portion (e.g., the viewer module 102, modules on the device 130) and a server-side portion (e.g., the server-side module 106). In some implementations, a portion of the data processing is implemented as a standalone application installed on the viewer device 104 and/or the curator device 130. In addition, the division of functionality between the client and server portions of client environment data processing can vary in different implementations. For example, in some implementations, the viewer module 102 is a thin-client that provides user-facing input and output processing functions, and delegates data processing functionality to a backend server (e.g., the server system 108). In another example, in some implementations, the curator device 130 delegates data processing functionality (e.g., image analysis) to a backend server (e.g., the server system 108).

Figure 2:
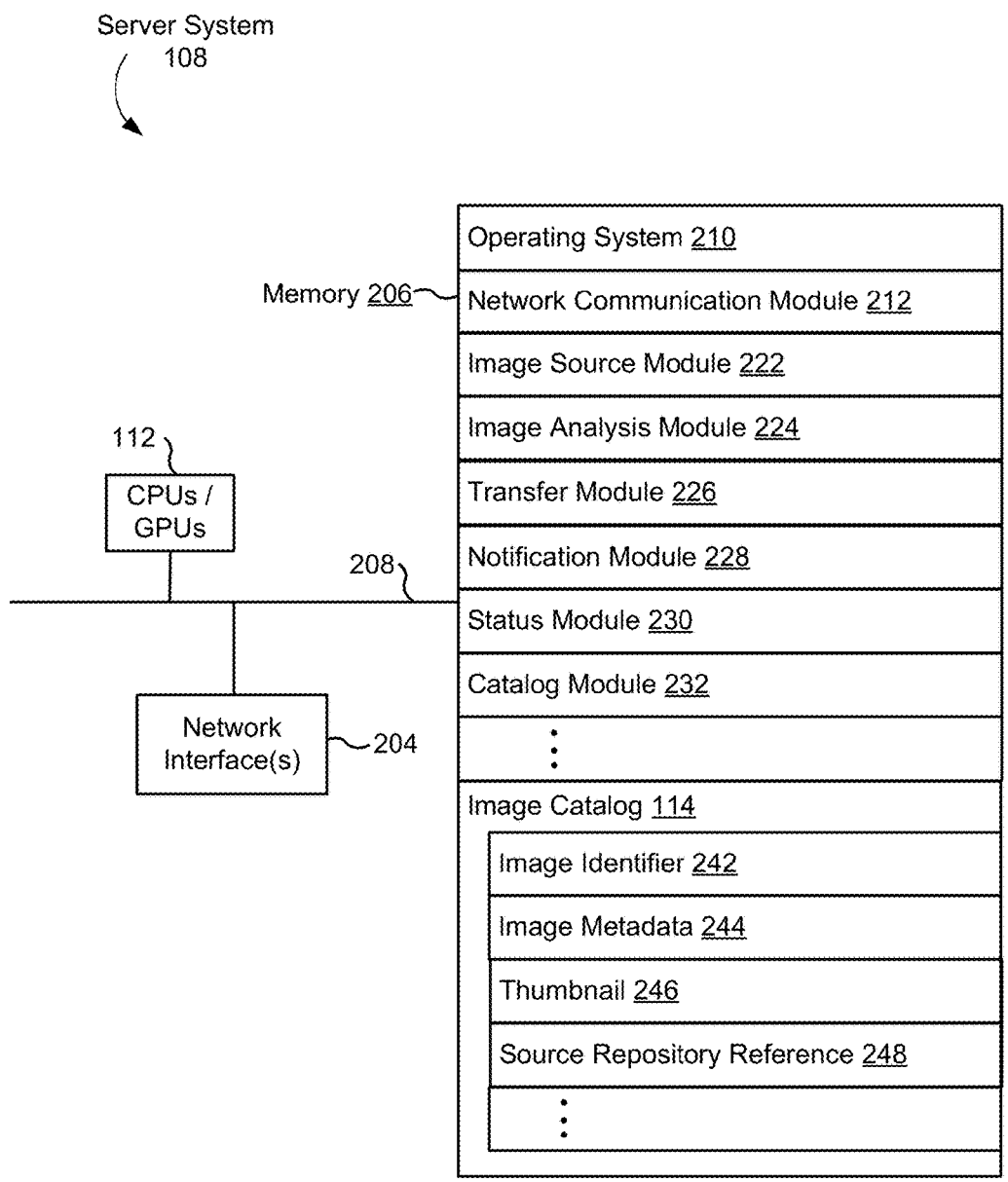
FIG. 2 is a block diagram of a server system in accordance with some implementations.

FIG. 2 is a block diagram illustrating the server system 108 in accordance with some implementations. The server system 108 may include one or more processing units (e.g., CPUs and/or GPUs) 112, one or more network interfaces 204 (e.g., including an I/O interface to one or more clients 118 and an I/O interface to one or more external services 120), one or more memory units 206, and one or more communication buses 208 for interconnecting these components (e.g. a chipset).

The memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, optionally, includes one or more storage devices remotely located from one or more processing units 112. The memory 206, or alternatively the non-volatile memory within the memory 206, includes a non-transitory computer readable storage medium. In some implementations, the memory 206, or the non-transitory computer readable storage medium of the memory 206, stores the following programs, modules, and data structures, or a subset or superset thereof:
- operating system 210 including procedures for handling various basic system services and for performing hardware dependent tasks;
- network communication module 212 for connecting server system 108 to other computing devices (e.g., viewer devices 104 and external service(s) 122) connected to one or more networks 110 via one or more network interfaces 204 (wired or wireless);
- server-side module 106, which provides server-side data processing (e.g., user account verification, instant messaging, and social networking services), includes, but is not limited to:
  - an image source module 222 for connecting to image source repositories (i.e. image database 123 on external service 122);
  - an image analysis module 224 that processes images and stores the processed images along with image metadata to the image catalog 114;
  - a transfer module 226 that communicates with the curator device 130 and the viewer device 104 to handle transfer requests;
  - a notification module 228 to send and receive notifications to and from the viewer device 104 and the curator device 130;
  - a status module 230 to provide status of the images during transfer; and
  - a catalog module 232 to manage the image catalog 114.
- one or more server database of image catalogs 114 storing data for image catalogs, including but not limited to:
  - an image identifier 242 to uniquely identifies each image stored in the image catalog 114; in some implementations, each image has a globally unique identifier (GUID); the image catalog 114 can be queried to return a list of GUIDs using standard query language, and group requests are structured using either query language or an array of GUIDs;
  - an image metadata 244 storing metadata extracted from images processed by the image analysis module 228;
  - a thumbnail 246 storing thumbnail of images; the image catalog 114 caches results locally on demand.
  - a source repository reference 248 storing a reference to the location of the full size images stored in the source repositories (e.g., the image databases 123 in the external services 122); and
  - though not shown in FIG. 2, a temporary container to temporarily store full size images during image transfer.

In some implementations, the image catalog module 232 manages multiple image repositories, providing methods to access and modify data that can be stored in local folders, NAS or cloud-based storage systems. The image catalog 114 can even search offline repositories. Offline requests are handled asynchronously, with large delays or hours or even days if the remote machine is not enabled. The image catalog module 232 manages permissions and secure access for a wide range of databases. Queries to the image catalog 114 work on groups of images to reduce bandwidth and improve performance in accordance with some implementations. Each of the data types including but not limited to the image identifier 242, the image metadata 244, the thumbnail 246, and/or the source repository reference 248 can be requested for an entire group of images in a single call.

Though not shown in FIG. 2, one of more caches are used to improve performance. In some implementations, a local NoSQL database is used to cache results in a format suitable for fast in-memory access. In particular, thumbnails 246 are cached separately from metadata 244 for improved UI performance. In some implementations, thumbnails 246 are stored in standard 4-bit PNG files using their QUID as a filename, making debugging easier.

In some implementations, the data associated with each image can be broken into three groups, the original metadata as part of the image metadata 244, a computed thumbnail 246, and the metadata generated through image analysis to aid search, also stored as part of the image metadata 244. In some implementations, the thumbnail 246 typically uses 2-3 KB, the original metadata ranges from 0-1 KB, and the analyzed metadata is only a few hundred bytes. The analyzed metadata is the most frequently accessed data, and it is often cached locally in accordance with some implementations. Thumbnails 246 are also cached to disk locally in accordance with some implementations, so that the in-memory footprint of the application is minimized. The original metadata is compressed using context-specific knowledge in accordance with some implementations. For example, commonly used parameters like f-stop, manufacturer's name, or keywords can be stored using single-byte values which are automatically expanded as needed. This reduces the metadata size to a couple hundred bytes. In another example, storing compressed keywords and commonly searched values as single-integer values also improves search performance significantly by replacing string comparisons with integer comparisons.

In addition to storing metadata for images, in accordance with some implementations, the present invention can be extended to handle videos. For example, the image analysis process described in further details below can be performed on each frame of a video to compute keywords from a Deep Convolutional Neural Network, a color palette, histogram, OCR, and/or facial recognition, among others. After the image analysis, each metadata field stored in the image metadata 244 can include a frame range. During video analysis, efficient video processing can include skipping frames, reducing resolution, and/or using video compression hints, among others. For example, metadata associated with every N (N>=1) frames are analyzed and compared against previously computed values. If a value is added, the first frame of its range is marked and stored in the image metadata 244, and if a value is deleted the end of the frame range is marked and stored in the image metadata 244. This enables search within video sequences using a compact metadata representation.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
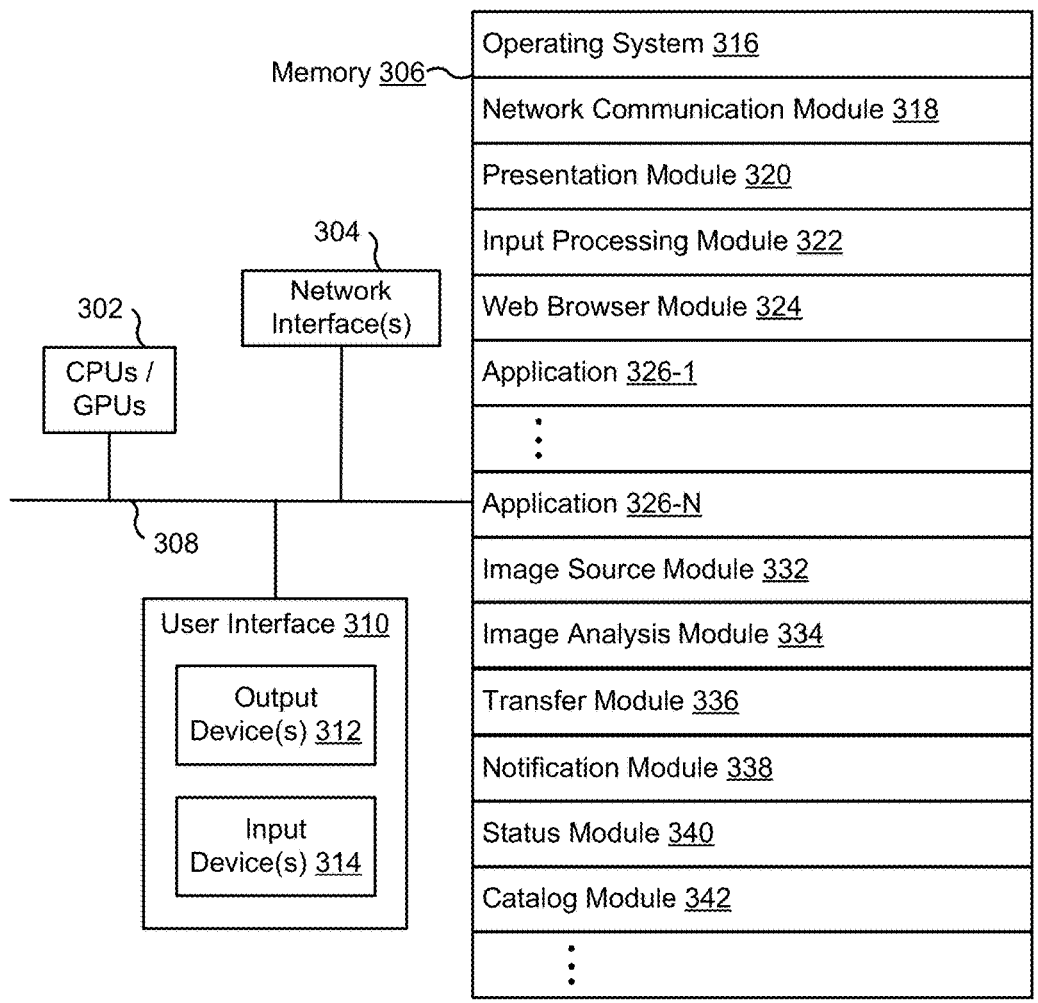
FIG. 3 is a block diagram of a curator device in accordance with some implementations.

FIG. 3 is a block diagram illustrating a representative curator device 130 in accordance with some implementations. A curator device 130, typically, includes one or more processing units (e.g., CPUs and/or GPUs) 302, one or more network interfaces 304, memory 306, optionally one or more sensors or image caption devices, and one or more communication buses 308 for interconnecting these components (sometimes called a chipset). Curator device 130 also includes a user interface 310. The user interface 310 includes one or more output devices 312 that enable presentation of media content, including one or more speakers and/or one or more visual displays. The user interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some curator devices 104 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting the curator device 130 to other computing devices (e.g., the server system 108 and external service(s) 122) connected to one or more networks 110 via one or more network interfaces 304 (wired or wireless);

presentation module 320 for enabling presentation of information (e.g., a user interface for a social networking platform, widget, webpage, game, and/or application, audio and/or video content, text, and/or displaying an encoded image for scanning) at the curator device 130 via one or more output devices 312 (e.g., displays, speakers, etc.) associated with user interface 310;

input processing module 322 for detecting one or more user inputs or interactions from one of the one or more input devices 314 and interpreting the detected input or interaction (e.g., processing the encoded image scanned by the camera of the client device);

one or more applications 326-1-326-N for execution by the curator device 130 (e.g., camera module, sensor module, games, application marketplaces, payment platforms, social network platforms, image source module, image analysis module, transfer module, notification module, status module, catalog module, and/or other applications involving various user operations);

curator module, which provides curator data processing and functionality, including but not limited to:
  image source module 332 for connecting to image source repositories (i.e. image database 123 on external service 122);
  image analysis module 334 that processes images and stores the processed images along with image metadata to the image catalog 114;
  transfer module 336 that communicates with the curator device 130 and the viewer device 104 to handle transfer requests;
  notification module 338 to send and receive notifications to and from the viewer device 104 and the server 108;
  status module 340 to provide status of the images during transfer; and
  catalog module 342 to remotely manage the image catalog 114.

In some implementations, the image analysis module 334 uses a rule-based language to allow custom extensions of the analysis that incorporates custom decision rules and external data sources, such as spreadsheets or databases. For example, the data manager 132 can write a rule that looks up baseball statistics from a company database based on the date associated with the image. These custom rules can be run once by the image analysis module 334 and the results can be cached as keywords stored in the image catalog 114 as the image metadata 244.

In some implementations, the curator applications 326 runs as an OSX toolbar service app, or as a Windows system tray application that monitors a set of local or remote image repositories (e.g., the image databases 123), analyzes the images in the set of local or remote image repositories, and after the analysis, uploads image metadata for any images added (or removed) to the source image repositories (e.g., the image databases 123). Referring back to FIG. 1, though FIG. 1 illustrates one curator device 130, multiple curator devices 130 may exist on separate devices working with a shared image catalog 114.

The image analysis performed by the image analysis module 334 includes extracting semantic information from the image using computer vision, OCR, facial recognition and color palette algorithms that can be compute-intensive. In some implementations, the image analysis is performed when the system is idle so that normal desktop work is not disrupted.

Figure 4:
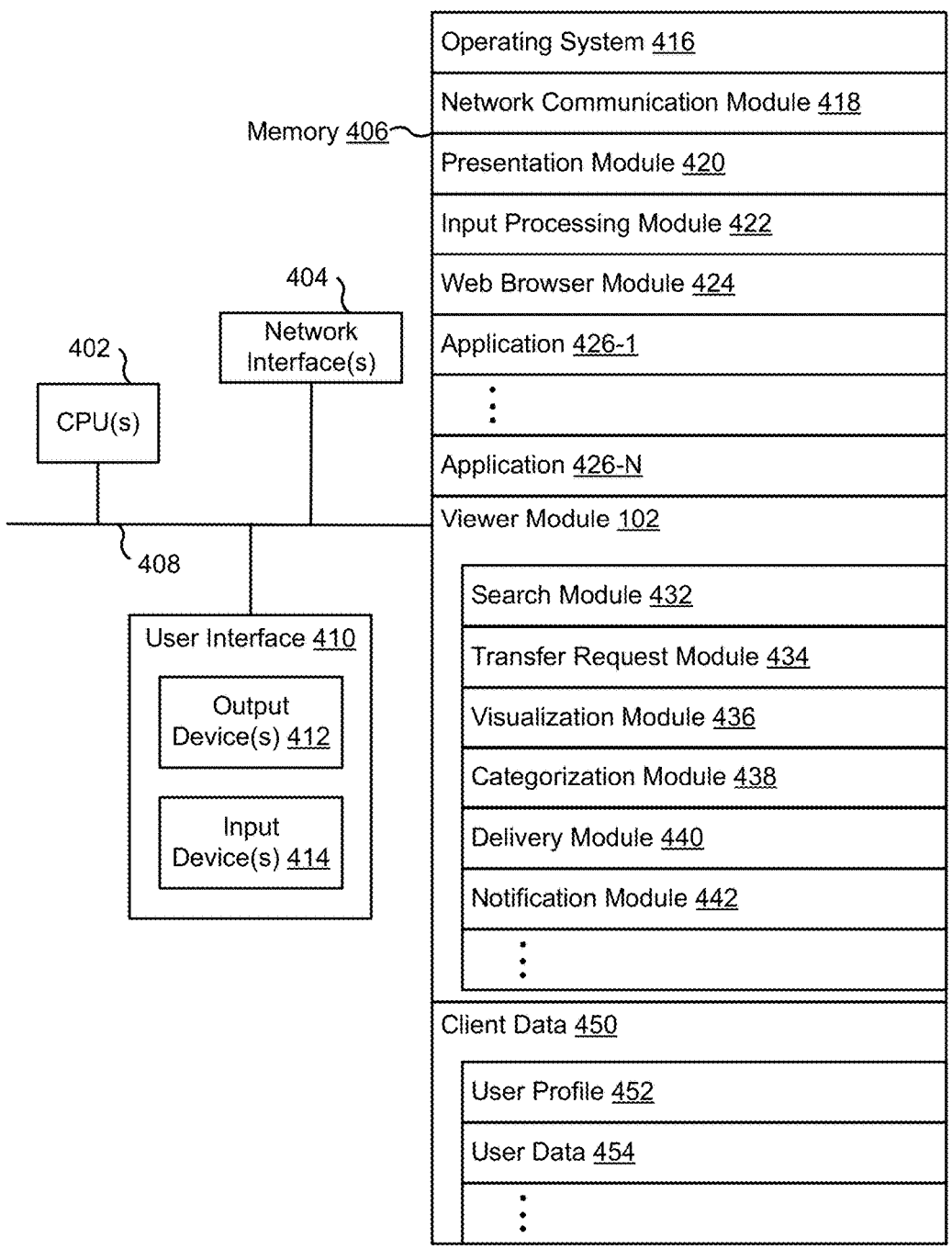
FIG. 4 is a block diagram of a viewer device in accordance with some implementations.

FIG. 4 is a block diagram illustrating a representative viewer device 104 in accordance with some implementations. A viewer device 104, typically, includes one or more processing units (CPUs) 402, one or more network interfaces 404, memory 406, optionally one or more sensors and/or image capture devices, and one or more communication buses 408 for interconnecting these components (sometimes called a chipset). Viewer device 104 also includes a user interface 410. The user interface 410 includes one or more output devices 412 that enable presentation of media content, including one or more speakers and/or one or more visual displays. The user interface 410 also includes one or more input devices 414, including user interface components that facilitate user input such as a keyboard, a mouse, a voice-command input unit or microphone, a touch screen display, a touch-sensitive input pad, a camera, a gesture capturing camera, or other input buttons or controls. Furthermore, some viewer devices 104 use a microphone and voice recognition or a camera and gesture recognition to supplement or replace the keyboard.

Figure 6A:
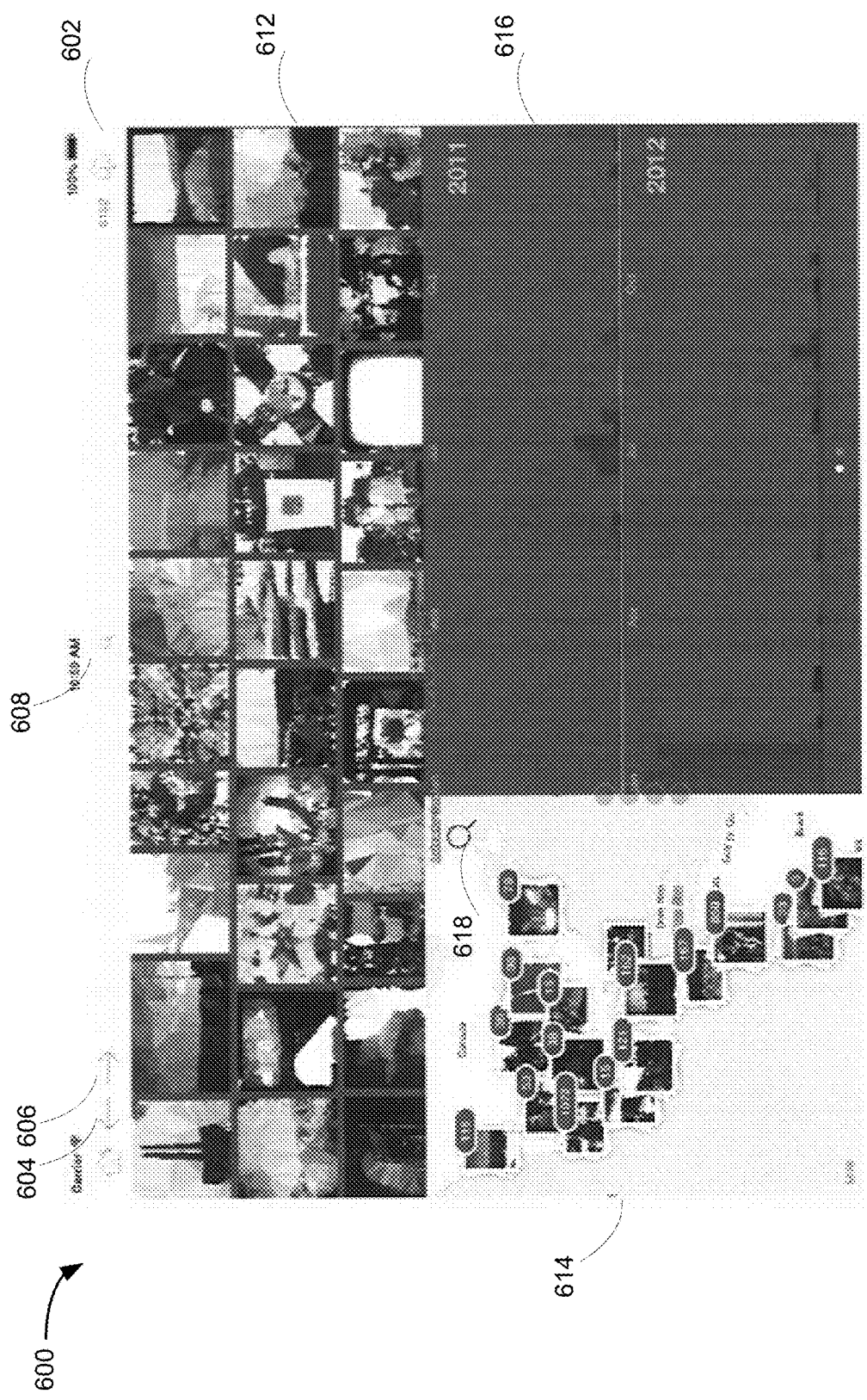
FIG. 6A is a graphical user interface of a navigator dashboard in accordance with some implementations.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- operating system 416 including procedures for handling various basic system services and for performing hardware dependent tasks;
- network communication module 418 for connecting viewer device 104 to other computing devices (e.g., server system 108 and the curator device 130) connected to one or more networks 110 via one or more network interfaces 404 (wired or wireless);
- presentation module 420 for enabling presentation of information (e.g., a user interface for a social networking platform, widget, webpage, game, and/or application, audio and/or video content, text, and/or displaying an encoded image for scanning) at viewer device 104 via one or more output devices 412 (e.g., displays, speakers, etc.) associated with user interface 410;
- input processing module 422 for detecting one or more user inputs or interactions from one of the one or more input devices 414 and interpreting the detected input or interaction (e.g., processing the encoded image scanned by the camera of the client device);
- one or more applications 426-1-426-N for execution by viewer device 104 (e.g., search module, transfer request module, visualization module, categorization module, delivery module, notification module, camera module, sensor module, games, application marketplaces, payment platforms, social network platforms, and/or other applications involving various user operations);
- viewer module 102, which provides client-side data processing and functionality, including but not limited to:
  - search module 432 to perform search of image(s) in the image catalog 114;
  - transfer request module 434 to handle image transfer requests initiated by the viewer 124;
  - visualization module 436 to present visualization of images in a dashboard as shown in FIG. 6A to the viewer 124;
  - categorization module 438 to categorize images and manage tags of images;
  - delivery module 440 to deliver images in various formats; and
  - notification module 442 to send and receive notifications to and from the server 108 and/or the curator device 130; and
- client data 450 storing data of a user associated with the viewer device 104, including, but is not limited to:
  - user profile data 452 storing one or more user accounts associated with a user of viewer device 104, the user account data including one or more user accounts, login credentials for each user account, payment data (e.g., linked credit card information, app credit or gift card balance, billing address, shipping address, etc.) associated with each user account, custom parameters (e.g., age, location, hobbies, etc.) for each user account, social network contacts of each user account; and
  - user data 454 storing usage data of each user account on viewer device 104.

FIG. 5 is a process flow diagram 500 illustrating image uploads by a curator device 130 in accordance with some implementations. In some implementations, the curator device 130 is responsible for seeking out images from local and cloud storage (e.g., the image databases 123), performing image analysis and uploading the results to the image catalog database 114. In some implementations, the curator device 130 can manage multiple image repositories (e.g., image databases 123 in external services 122) by first connecting (502) to the image repositories. In some implementations, a mechanism (e.g., a software development kit, SDK) is provided for the curator device 130 to add new database connections to enable the addition of new and proprietary image repositories and to interact with proprietary systems. In some implementations, the computer system 100 has a modular system for adding support for new database types. For example, a set of modules can be provided to support a wide range of existing image databases 123, including Flickr, Google+, Dropbox, Facebook, Adobe Lightroom, and many others.

After a successful authentication to connect (502) to the image repositories (e.g., the image databases 123), the curator device 130 seeks (504) images stored in the image repositories (e.g., the image database 123) and performs (506) image analysis. Many image file formats, including JPG, TIFF, and PNG, can store textual information along side the image pixels. Methods in accordance with some implementations access image metadata independently from the pixel data. Certain metadata fields can be accessed independently, without requiring the transfer of the entire image metadata block. In some implementations, metadata for groups of images can be accessed with a single method call to minimize bandwidth. The returned data is encrypted and compressed during transfer to ensure security in accordance with some implementations. In some implementations, the present disclosure can be extended to applications used in the medical industry (e.g., HIPPA, DIACOMP). The medical industry has a number of unique security issues and specialized image file formats and metadata fields. Extending the core services in this present disclosure to handle these features fits well within the SDKs described in further details below.

The metadata 244 is generally extensible, allowing the storage of arbitrary text that can include keywords, camera information, GPS coordinates, or program parameters. Due to the extensible nature of the metadata 244, the present disclosure does not rely on the existence of any particular metadata field in all images when performing (506) image analysis. In some implementations, the curator device 130 extracts the metadata 244 from the source images stored in the image databases 123, and enhances it by running and performing (506) a series of image analysis operations to compute semantic and structural data about the image before uploading (520) the results to the image catalog 114. The uploaded image analysis result includes but not limited to metadata 244, thumbnail 246, and a reference to the source repository 248 (e.g., a link to the image location in the image database 123).

In some implementations, many of the image analysis (506) processes can optionally use a graphic processing unit (GPU) to improve performance, if available. The image analysis performance (506) are expensive to execute, often taking many seconds to run on each image. In some implementations, the system performs this time-consuming work in the background on the desktop computer (e.g. the curator device 130 by the image analysis module 334) or the server 108 running the image analysis module (e.g. by the image analysis module 224). In some implementations, the server 108 receives from a first user identification (e.g., the data manager 132) of one or more images in a first image database (e.g., the image database 123), the first image database (residing on the external service 122) is distinct from the one or more servers, for each image of the one or more images, the server 108 analyzes the respective image to extract respective keywords that describe the respective image, and creates a respective index entry in the image catalog 114, the respective index entry includes the respective keywords.

Figure 5A:
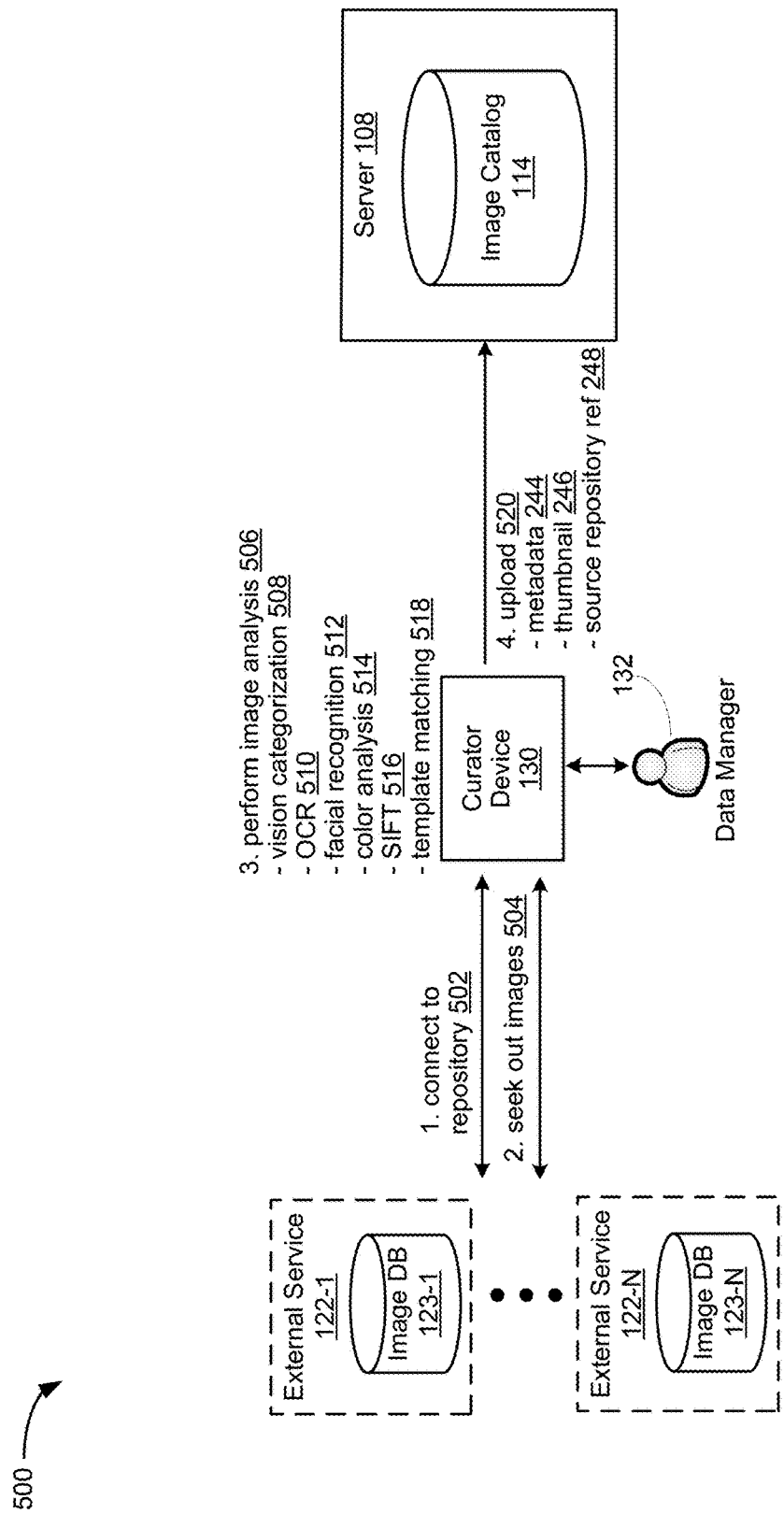
FIG. 5A is a process flow diagram illustrating establishing an image catalog with the assistance of a curator device in accordance with some implementations.
Figure 5B:
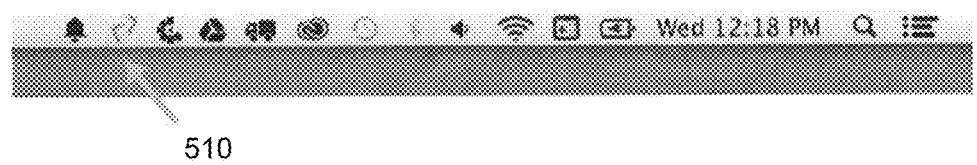
FIG. 5B is a graphical user interface of a system tray with a curator application icon displayed in accordance with some implementations.

FIG. 5B is an example user interface illustrating a curator application that runs in the background. The curator application shown as an icon 510 monitors the curator device 130 and/or the server 108 usage and pauses processing so as not to block foreground applications running on the curator device 130 and/or the server 108. In some implementations, the curator application runs as an OSX toolbar service app, or as a Windows system tray application that monitors a set of local or remote image repositories (e.g., the image databases 123), analyzes and uploads image metadata for any images added (or removed) to the repositories (e.g., the image databases 123). The image analysis performed (506) by the curator device 130 as shown in FIG. 5A can be compute-intensive. In some implementations, the image analysis is performed (506) when the curator device 130 is idle, so that the normal curator device 130 desktop work is not interrupted by the image analysis. In some implementations, the curator device 130 delegates the image analysis function to a backend server (e.g., the server system 108).

Figure 5C:
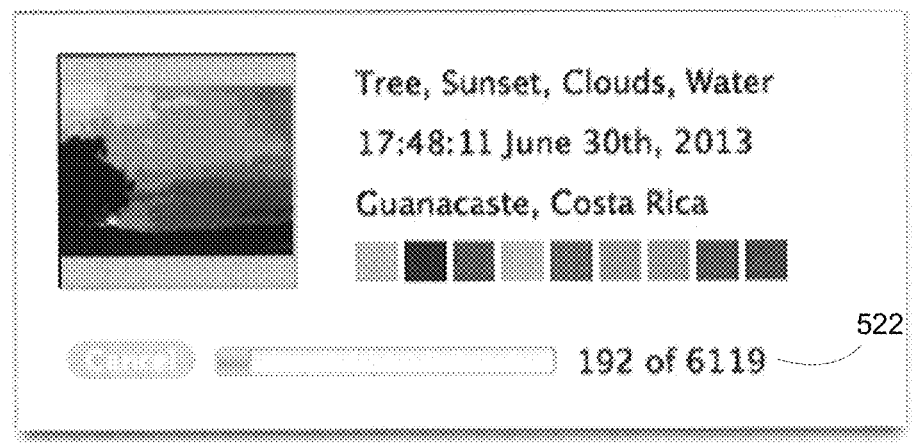
FIG. 5C is a graphical user interface of a curator application in accordance with some implementations.

FIG. 5C illustrates a portion of an example curator application user interface. In some implementations, modules of the curator application (e.g., the status module 230 and/or the status module 340) calculate current status 522 of the monitored repositories. And the interface to the curator application displays the calculated current status 522 of the monitored repositories, showing the number of images uploaded, the number of pending images remaining to be analyzed along with a time-to-completion estimate. A data manager 132 can add or remove repositories by specifying local folders, or by providing authentication login information for secured databases or cloud storage (e.g., the image databases 123). A large range of remote services including both consumer services such as Google, Flickr and Facebook and enterprise services such as Box, Dropbox, and secured databases are supported. A set of SDK enables the addition of repository types to enable adding proprietary image database formats.

Image analysis can be performed either on the full resolution image data, or on reduced resolution image thumbnails to improve performance at the expense of some quality loss. The image analysis can load the appropriately-sized image from the source repository (e.g., the image databases 123), perform a series of complex analysis that extract semantic and structural information from the image. For example, during the vision categorization (508) process, a set of categories 522, or image tags, are computed. In some implementations, the categories 522 or the tags describe the contents of the image using Deep Convolutional Neural Network Computer Vision algorithms. Tags such as "sunset" or "building" can be computed by examining the image which are very useful for natural search by the viewer device 104.

As used herein, tags are strings that are stored in the image metadata 244, such as in the IPTC:Keyword or EXIF UserComment fields. Tags can be generated automatically by the curator application during the image analysis, or applied manually in the viewer tool or other image editing applications. Tags are typically used to identify features or properties of an image. Tags are often used to group images into sets, such as Minter or #Landscape, and they can also be used to manage workflow, such as #Draft or #Public.

The categories as tags, along with other information about the faces, text, colors and key visual structure of the image are then encoded along with the native image metadata (EXIF, IPTC, dates, times, camera and other information included in many image files) and uploaded as securely encoded and compressed data to the image catalog 114. In some implementations, the curator device 130 uploads about 2-5 KB of data per image, whereas a full-resolution image file is often tens of megabytes, a 1000× compression ratio. The bulk of the uploaded data is a compressed image thumbnail 246. The thumbnails 246 are used by the viewer module 102 in lieu of loading the entire image from the image databases 123, which is not possible for some of the local image repositories.

In some implementations, compressed image data is less than 4K per image. The compressed image data may include the metadata from the original image, the additional metadata computed through image analysis. The compressed data may include a thumbnail image (e.g., used as a proxy). As a result, a user can store 1 MB image references for about 3 GB of original image. This is often small enough so that the entire Catalog can be cached locally, even on mobile devices, to improve interactivity and search performance dramatically.

Referring back to FIG. 5A, in some implementations, the image analysis performance (506) provides a set of leading-edge image processing algorithms that extract semantic and structural information from an image to improve search. These time-consuming and complex algorithms are performed as part of the analysis by the curator device 130, requiring no user-intervention. The results are not directly apparent to the data manager 132 and/or the user 124. Instead, the data manager 132 and/or the user 124 is merely able to perform natural language and SQL-like search queries. Rather than manually tagging and organizing the images, image analysis is performed (506) to compute a cluster of high-quality semantic and structural information for each image completely automatically. Search algorithms then use this data to produce ranked results providing smart, fully automatic image search.

The processes (508-518) are run on reduced-resolution versions of the original image stored in the image databases 123 (unless the original is small). In some implementations, the processes (508-518) include vision categorization (508) (e.g. a Deep Convolutional Neural Network) to extract image categories (keywords), Optical Character Recognition (OCR) (510) to extract text, facial recognition (512) to find faces and match them up to known people, color analysis (514) and structural analysis (516) to identify similar images. The errors produced during the processes (508-510) can be reduced by training. The more context-specific training the system performs, the higher quality the results.

When performing (506) image analysis, the latest computer vision algorithms (vision categorization (508)) can extract meaningful information from the images stored in the image databases 123. Computer vision categorization (508) is also an auto-tagging process. In some implementations, the categorization (508) uses a Deep Convolutional Neural Network to analyze each image to produce a set of keywords describing the semantic content. For example, one can analyze vacation photos and return keywords such as "sunset", "building" or "trees" and use these to improve the system's ability to search images with natural language. The training can continue to improve the quality of the image analysis results. After ingesting, the system checks to see if any of the images being analyzed (506) contain manually added keywords, and the system uses those images to improve the training data set. That way the automatic tagging process done using categorization can have context-specific improvements for each client. To further improve the quality of search results, in some implementations, the system stores the keyword sets and associated error metrics returned by vision categorization (508). The stored keyword sets and associated error metrics can then be used to train and improve the quality of the image analysis (506) process.

OCR (510) can be used to extract text, jersey numbers, signs, and logos. The text extracted from each image is stored in a metadata field (e.g., UserComment). During natural language searches, this metadata field can be used as part of the search, because it often contains company names, street signs, jersey numbers, or other information (e.g., Starbucks street sign) that improves natural language search.

Facial recognition (512) can be used to match faces to names. The facial recognition (512) is performed on all images and a training network can be used to match facial geometry to known faces. The training set can be extended using manual facial identification from within the viewer device (104) tool. By identifying people in a few images, the facial recognition (512) process can do a significantly better job of finding those same people in other images. For example, after one identifies a CEO or key individuals in a handful of images, the system can use that data to find those same people in the other photos in the user's portfolio.

Color analysis (514) and SIFT (516) can identify cropped and modified images to track duplicates and variations of images after processing. The system extracts the metadata for each image including its origin, dates and statistical information and compress it along with a deep image analysis and store this data in a custom database, the image catalog 114, that is designed to enable fast searches through truly enormous image collections consisting of millions of individual images.

Figure 5D:
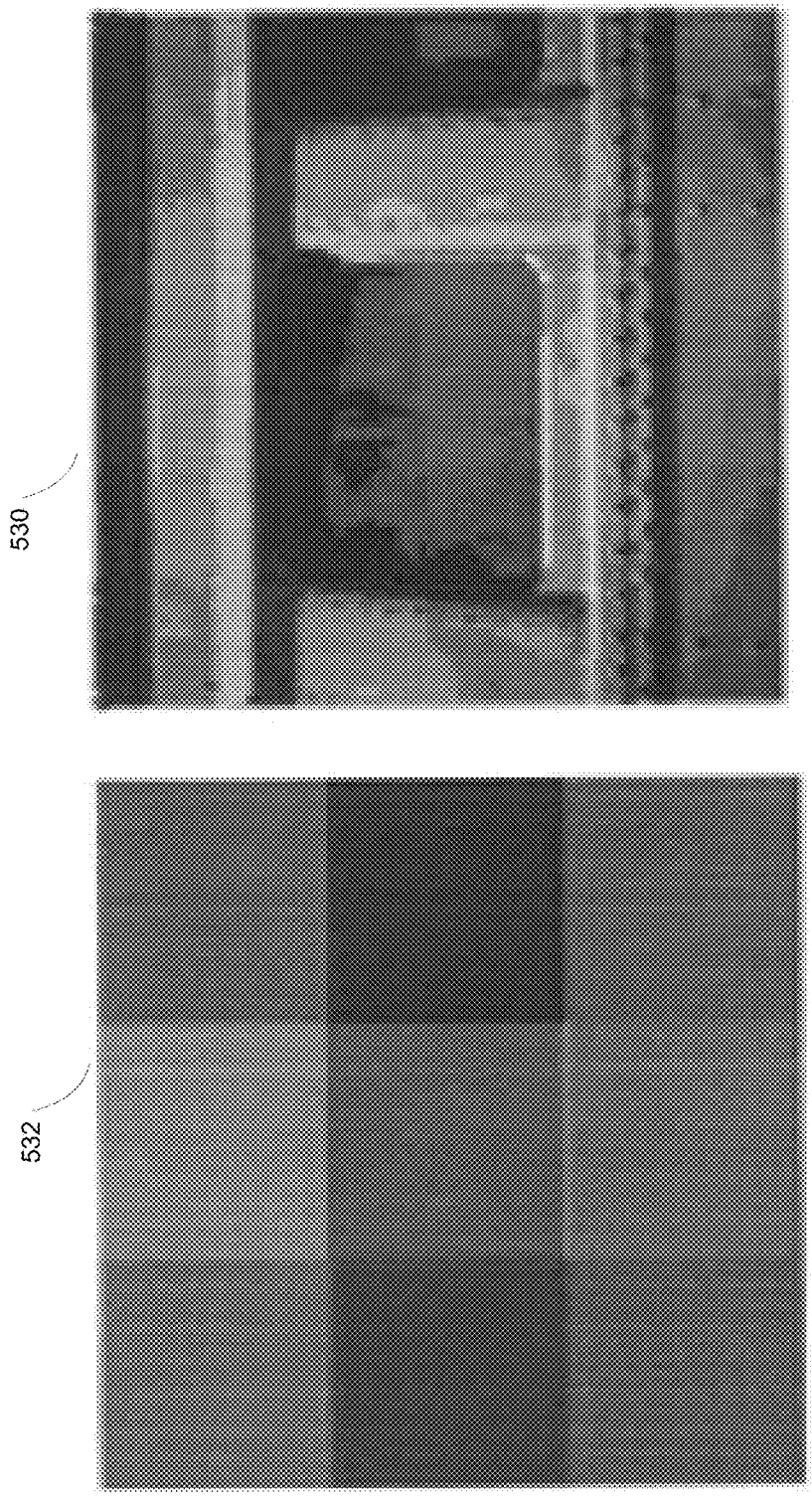
FIG. 5D illustrates an example color spatial converted from an image in accordance with some implementations.
Figure 5E:
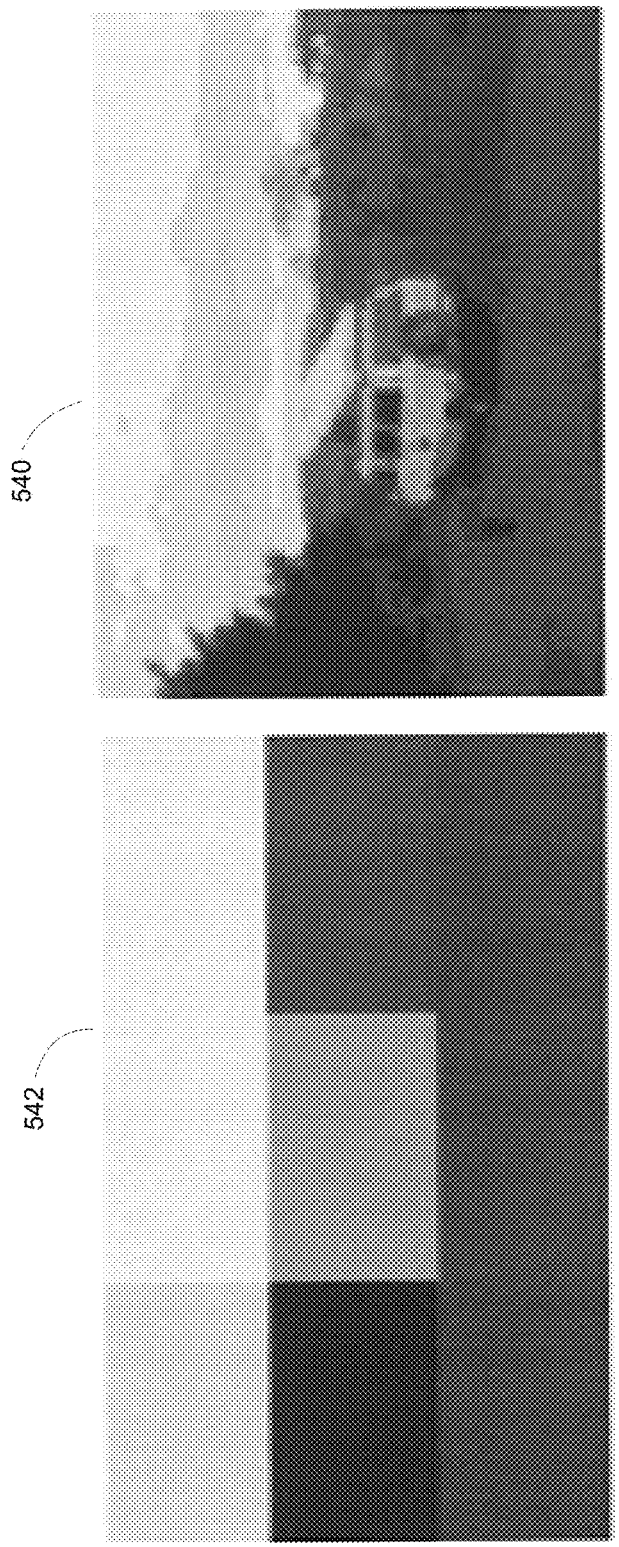
FIG. 5E illustrates an example thumbnail color palette converted from an image in accordance with some implementations.

There are two forms of color analysis on images as shown in FIG. 5D and FIG. 5E. First, as shown in FIG. 5D, the image 530 is converted into a 4-bit (16 color) thumbnail 532. And second, as shown in FIG. 5E, a 9 color palette 542 is computed with spatial information. As used herein, color palette extraction determines the distribution of color in each image or distribution of color within designated sub-regions of each image. As shown in FIG. 5E, the 9-color spatial palette 542 is designed to be used as a thumbnail proxy, where each of the 9 colors is associated with one of 9 regions in the original image 540, similar to a 3×3 thumbnail. The color displayed for each of the regions represents an average of the colors from the corresponding region in the original image 540. Each region in the original image 540 is given a weight to indicate its relative size, so that one can vary the size of each region to better match the original image while still using minimal storage. The 9-color palette 542 is embedded with the image metadata so that it can be accessed quickly, without requiring download of the thumb image 246.

As used herein, thumbnails 246 are small representations of images. The system 100 assumes that each image has an associated thumbnail. In some implementations, thumbnails 246 are stored using 4 bits per pixel, each of which can take on one of 16 unique colors, with ~10,000 pixels (e.g, 100×100). A typical thumbnail takes 2-3 KB of data, compared to tens of megabytes for full resolution photos. In some implementations, the image analysis creates thumbnails for each new or modified image using high-quality decimation filters and palette analysis to select the best 16 colors. A 9-tile spatial palette 542, which selects nine colors from the image along with their spatial location and weights, is computed and stored as a special metadata field to use as a proxy when the full 4-bit thumbnail is not available, or when the onscreen thumbnail is only a few pixels in size. This allows the 9-color palette 542 to be used as a quick proxy even when the image is displayed as only a few pixels on screen. The 9-color spatial 542 and 16-color thumbnail palettes 532 are both used to aid in search and ordering and graphing images based on color. Each color is given a priority weighting so that one can define a uniquely ordered sort. This allows users to sort thumbnails by color, or plot images in a scatter diagram based on color usage.

The image analysis described above extracts semantic information from the image pixels. During vision categorization (508), algorithms such as a Deep Convolutional Neural Network, based on a proprietary training set, extract keywords describing the semantic objects in the image. Multiple independent neural networks with context dependent training sets provide expert analysis of specific types of images. Rather than a single network trained for all images, the discrete networks each operate independently, providing a ranked set of keywords that identify generic objects, company specific identifiers (logos, colors, people), topic specific data (sports stadiums and locations, known paintings, medical imagery) and combine the results to provide a broad set of context specific terms. The discrete networks accept high level data including perceptual color spaces (e.g. HSV & LAB), subject based segmented color palettes, and shape analysis. During OCR (510), any text from the image including logos, street signs, jersey numbers, or document text, can be extracted. During facial recognition (512), basic facial and body features are extracted and matched against a set of known geometries to generate names.

The users can further extend the semantic processing using a domain specific language to define heuristic rules. Individual algorithms are enhanced in a second round of extensible rule based processing that combines the results of the individual steps with known global datasets. For example, if the execution of deep convolutional neural network analysis during the vision categorization (508) extracts the keyword "baseball", the color analysis (514) can include a match against known baseball team colors to generate a team name. Users can implement their own custom rules for their unique content and data. Context specific data, such as company events, historical statistics (e.g. play-by-play data from each game), facial geometries of key individuals, and corporate hierarchies can be compared against the data generated by the initial pass to generate a higher level set of keywords that improve search. For example, one can search for "triple plays in Dodger's stadium" or "Stanley Cup Playoffs" neither of which is directly accessible via basic image analysis without context specific data.

Still referring to FIG. 5A, template matching (518) finds matches between images using structural (geometric) analysis. For example, if one crops an image, template matching (518) searches for a match between the cropped region and all other images. Because template matching relies on the resolution independent features in the image, rather than individual pixel values, it can find matches between images that are scaled, color corrected, or even after moderate adjustments. Softer matches return results of images with similar layouts. When combined with categorization terms, the soft matches allow the users to do searches for "similar" images.

The more exact matches allow users to find image duplicates, and to track the history of an image through image adjustments (color correction, editing, etc) and to find copies of the same image posted to various repositories and social services. One can combine these into a single image "timeline" history, so that one can treat multiple copies of the image as a single unit and know its entire version and posting history.

Template matching 518 detects when one image is extracted (cropped) from another image, or if two images share the same source. This time-consuming process can be used to identify images that were cropped from an original. Doing template matching on large image collections is prohibitively expensive when performed using brute-force matching ($N_2$). However, the system in accordance with some implementations can dramatically reduce the number of comparisons using additional image metadata, dates, and locations etc.

Figure 5F:
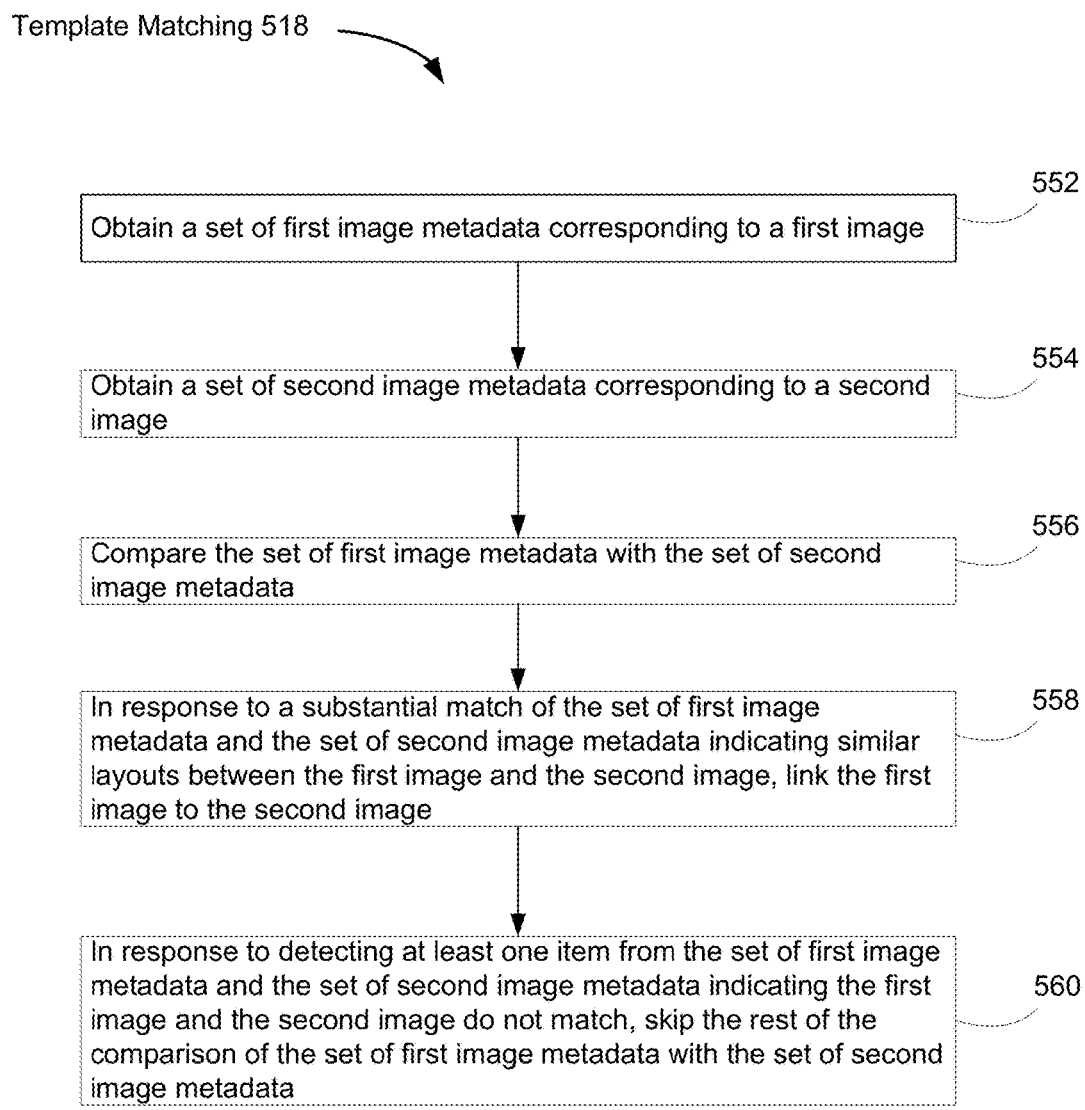
FIG. 5F is a process flow diagram illustrating a template matching process in accordance with some implementations.

FIG. 5F is a process flow illustrating the template matching (518) function in accordance with some implementations. During a curator device (130) and/or a server (108) first obtains (552) a set of first image metadata corresponding to a first image, followed by obtaining (554) a set of second image metadata corresponding to a second image for comparison (556) of the set of first image metadata with the set of second image metadata. In response to a substantial match of the set of first image metadata and the set of second image metadata indicating similar layouts between the first image and the second image, the system links (558) the first image to the second image. For example, when the system detects a cropped, duplicated, or color corrected image based on the metadata comparison, the system can link it as a variation the original image so that the relationship can be displayed as part of a history view in the viewer application. To reduce the number of comparisons, in accordance with some implementations, the system can in response to detecting at least one item from the set of first image metadata and the set of second image metadata indicating the first image and the second image do not match, skip (560) the rest of the comparison of the set of first image metadata with the set of second image metadata. For example, using image creation dates in the metadata, the system can skip comparing an image created earlier than the test crop. In another example, the system can also do simple metadata matching to find images with the same metadata, thus skipping commonly modified fields, like the creation date.

FIG. 6A is an example graphical user interface 600 illustrating an output on a viewer device 104. In some implementations, the viewer module 102 provides a real-time dashboard for an entire image portfolio with views for thumbnails 612, maps 614, and graphs 616 along with a search bar 602 to allow a user to refine the set of images displayed in each view. The viewer 124 can use the search bar 602 to quickly find images that have been uploaded to the image catalog 114 from any of the image repositories (e.g., the image databases 123). The search results displayed in the visualization dashboard by the visualization module 434 can be dynamically updated. Most gallery applications provide a peephole into a huge collection, showing only a dozen or two image thumbnails at any moment. Using graphs 616 and maps 614, the viewer module 102 provides an overview of large groups of images using interactive statistical visualizations. The viewer 124 can view thousands of thumbnails as tiny icons ordered into useful groups, perhaps months or years, by color palettes or by categories.

When performing searches using the search bar 602, an image search library (e.g., the search module 432) uses the data computed by the image analysis library (e.g., the image analysis module 224 and/or the image analysis module 334) and stored in the image catalog 114 to compute a ranked set of results for a given search string. The search library then breaks the search string entered in the search box 608 into boolean commands and a number of specialized ranking metrics to sort the images in the database, returning any that are considered high quality matches. The entirety of the each search is captured in a single string, displayed in the search box 608. In some implementations, search history is a stack of search strings accessed via the back button 604 and forward button 606 adjacent to the search box 608, matching the well-understood browser interface pattern. Searches can be trivially copied and pasted, sent via email, or stored for later use or sharing with colleagues in accordance with some implementations.

Like the image identifiers 242 stored in the image catalog 114, in some implementations, images are identified using globally unique identifiers (GUIDs) and search results are arrays of GUIDs in some implementations. Each result includes a GUID and a rank to indicate the quality of the match. The quality of all results is analyzed using clustering to select a final search result in some implementations. The search language allows construction of logical keyword combinations. The search library also manages the translation of GPS coordinates into place names. For color related searches, color names are converted into RGB value ranges and compared against 9-tile color palettes stored in the image metadata 244. Other data to keyword transformations can include, for example, converting dates into company-specific calendar events automatically extracted automatically from Facebook Events or manually from spreadsheets.

Search keywords can be combined with logical operations such as AND, OR and NOT. In some implementations, the language is modeled on the Google search operators and includes a subset of regular expression operators such as * for arbitrary string matching and number ranges specified with ellipsis, as in 50. . . 500. Search begins by breaking the search string into logical combinations of keywords. The system then traverses the image catalog 114 database ranking each of the keywords using a metric specific to the type of keyword search.

Hits on auto-tagged keywords use the confidence value computed during categorization, and hits on manually tagged keywords always have a higher precedence than auto-tagged keywords. Similarly, hits on manually entered place names have higher weight than hits on locations generated from GPS coordinates. The keywords are then combined using their logical operations to extend or filter the set using standard logical precedence. The final set of rankings is processed using a clustering algorithm and heuristic thresholds. The top results are returned and displayed, typically in rank order unless another ranking metric has been manually applied. In some implementations, the search library can use suggested search terms.

Still referring to FIG. 6A, the navigator as shown in FIG. 6A has three main visualization types below the search bar 602: thumbnails 612, graphs, 616, and maps 614. All views are dynamically linked, showing the current search set. Changes in any window are immediately reflected in all windows. Thumbnails 612 display a reduced-sized version of the full image, graphs 616 display quantitative information as bar, calendar, or scatter plots, and maps 614 display clustered images and heatmaps. Tapping on regions in each view restricts the current search by filtering the results based on the tapped location. For example, tapping on a #Dog bar in the category bar graph can filter results to those containing the #Dog tag, or tapping on the search icon 618 in the map view 614 can filter results to those that are currently visible in the map view. These interactions are converted into standard search strings and logically combined with the existing search string in order to retain state and allow undo and redo through the search stack.

The thumbnail view 612 is a zoomable flow layout of thumbnails which can be ordered using a number of different metadata fields. When zoomed out, thumbnails are replaced with simplified palettes to minimize aliasing and improve readability. Flow layouts are a modified grid that varies the number of images along each row based on aspect ratio to provide a more natural layout. In some implementations, by default, the thumbnail view 612 is ordered by creation date, and grouped into months and yearly sections, depending on the number of images in each section. Ordering can be based on any metadata field that provides a unique ordering of images, including but not limited to, by palette (providing a color spectrum), modification date, resolution, or camera attributes.

Graphs 616 display summary information for any metadata field, either computed during analysis or embedded by other applications or the camera, in a variety of useful formats, each of which is interactive, allowing the viewer 124 to point and click to select a subset of images quickly and intuitively. The graph view 616 is an extensible set of interactive bar, line, scatter and 3D charts that display statistical information about the current set of images. Graphs 616 can be added and organized to provide a custom dashboard displaying information useful to the viewer's 124 colleagues or customers. Each graph type can be set to use any appropriate metadata field. For example, the viewer 124 can have a bar chart that shows the frequency of each tag in the viewer's 124 portfolio, or it can show the breakdown of images based on aperture or resolution.

Figure 6B:
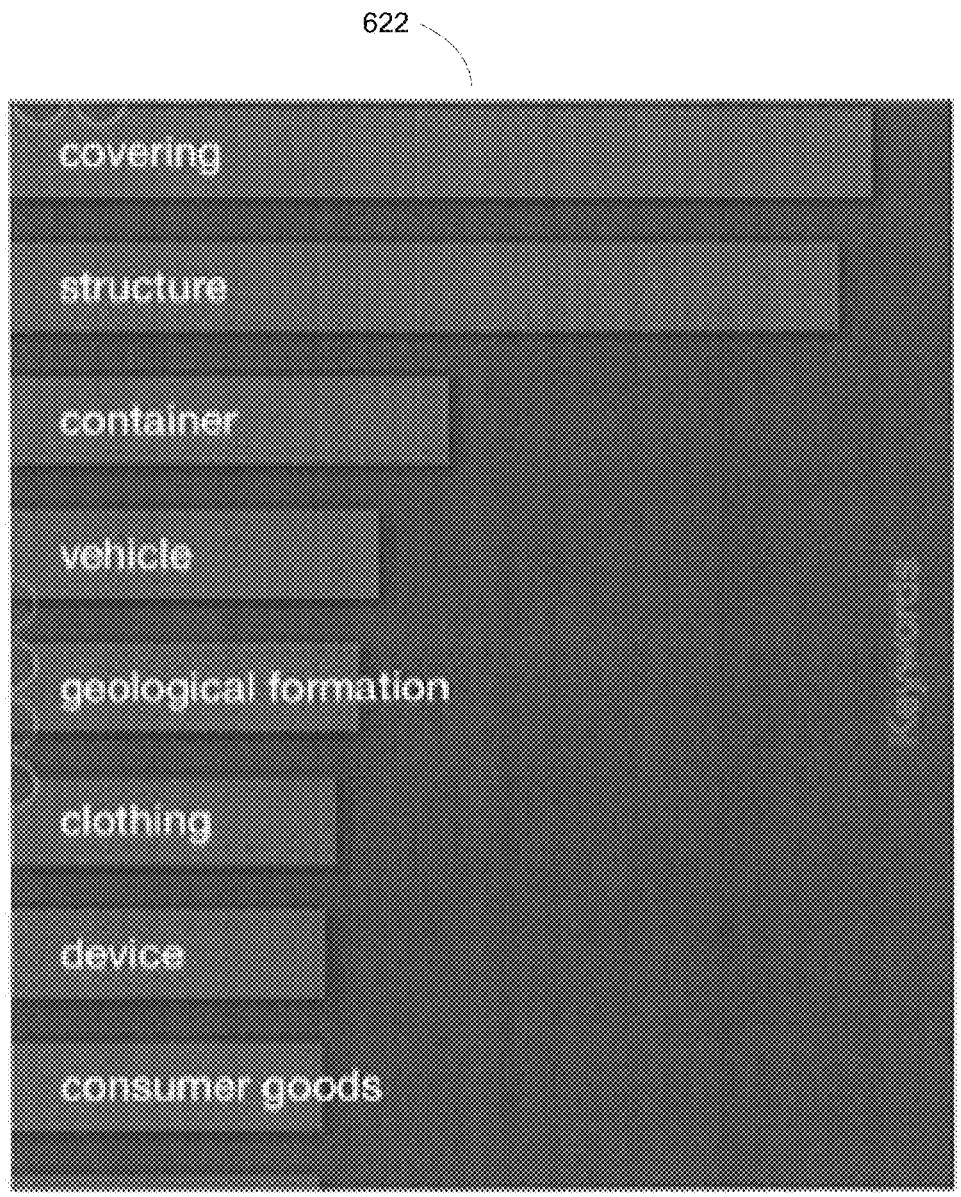
FIG. 6B is a graphical user interface of graph bar categories used in keyword searches in accordance with some implementations.

Graphs 616 are interactive. Tapping on a graph element can filter the current search results to show the set associated with the tapped region. For example, as shown in FIG. 6B, tapping on a specific image tag shows only images that have that tag, while tapping on a specific color selects images that contain that color range. Specialized graph types exist for common and useful image data. For example, color spectrum scatter charts show the breakdown of images based on color, and calendar heatmaps show the frequency of image creation at different times of day, week or year.

The map view 614 shows a map with thumbnail clusters and/or heat map overlays. The search results can be filtered to show only images within the current visible map region with a single tap. Heat map overlays can be based off of any image attribute. For example, the viewer 124 can graph a heat map of the aperture or lens type used to take each image, or use the creation date to see where images have come from over time. The map background can be varied in accordance with some implementations, selecting either the default native map, graphical variations from Stamen and Open Street Maps, or using a proprietary map server.

The dashboard 600 as shown in FIG. 6A is configurable. The viewer 124 can add or remove graphs or maps of various types to provide a customized view that the viewer 124 can share with colleagues. For example, the viewer 124 can provide a dashboard with graphs showing a time-based calendar view of all the images in the viewer's 124 portfolio along side a graph of all the categories across all image repositories (e.g., the image databases 123) to make it easy to search in both time or by category by simply clicking on the graphs. FIG. 6B is an example user interface 622 illustrating keyword search by clicking on the keyword category bars. The graph view 616 and the map views 614 are interactive, clicking on them will refine the search. For example, the viewer 124 can restrict the search to the images visible within the current map view by clicking on the search icon 618, or as shown in FIG. 6B, by clicking on one of the category bars in a graph. All views are linked, providing an overview of the entire portfolio or current search set.

The graphic view 616 and the map view 614 are interactive. Clicking on various elements in the dashboard, such as a region on the map 614, a bar or wedge in a chart of the graph 616, or a set of thumbnails 612, can update the search and all of the other graphical views immediately. Rather than typing searches in the search area 608, the viewer 124 can find images with a few taps as further shown in FIG. 6B. The back 604 and forward 606 buttons allow the viewer 124 to navigate the search history to quickly try a wide range of searches. The statistical graphs 616 and maps 614 show the profile of the current search or the entire image portfolio, providing an overview of millions of images uploaded to the image catalog 114.

Still referring to FIG. 6A, the viewer application 102 allows the user to add manual tags to both individual and groups of images (e.g. the current search set) by the categorization module 436. Tags can be displayed in the graph tools where they can be used to refine searches. For example, clicking on the #Dog bar in the category graph can select all images with the #Dog tag. Tags can also be removed from images, including automatically added tags, which can be useful when moving an image through a workflow or when correcting imprecise automatically added tags.

The curator application computes a set of tags automatically during image analysis (e.g., by the image analysis module 224 and/or the image analysis module 334) as described above, using computer vision algorithms among others. But these tags can be imprecise and they cannot capture context-specific information that is not readily available in the image. For example, they might figure out that it is a picture of a hockey game, but not that it is the final game of the Stanley Cup, or they might not know that the house in the picture was a user's first real estate purchase. Manual tags are always given priority over automatic tags in search rankings.

Data from the graphs 616 can be exported to spreadsheets to build a cost model of image use at the viewer's 124 organization. Monitoring image access, storage size and search queries provides the data needed to track the cost of storing, backing up and using the viewer's 124 image database to optimize company expenditures and revenue.

In addition to exporting from the graphs 616, the viewer tool can deliver search results and individual images to other applications and people in a variety of ways. In some implementations, a SDK provides a mechanism for clients to embed custom delivery mechanisms, including the ability to interact with proprietary systems. The current search group can always be immediately exported with a single click. The user can deliver either the URL to reference the original file location, or full images, with options to control naming, resolution, file format, and metadata stripping and additions. For example, the user can choose to deliver the images as JPG files with a specific resolution, stripping off all metadata and stamping in copyright and owner information into the metadata.

Because some of the files may not be directly available if they are stored on offline local storage, the delivery module 440 can deliver all available images immediately, and schedule transfer of the remaining files once they are available, similar to how a store might ship your order in separate packages. Offline delivery relies on the catalog transfer request protocol as described in further details below.

In some implementations, the viewer desktop application can be developed for Windows or OSX. Native browser and mobile versions can be added. For example, a viewer application can be implemented as a native iOS app, relies on a BaaS (Backend as a Service) database, which uses a custom database implementation to optimize for huge image collections.

Figure 6C:
FIG. 6C is an example map view in accordance with some implementations.

FIG. 6C illustrates an example map view with a path computed using GPS data from the smartphone photos to geotag DSLR pictures by date in accordance with some implementations. In the example map view, the viewer 124 can add location data to images that do not have GPS data by correlating images on the map. For example, photos taken with legacy cameras, logos, or other generated images can be correlated with GPS data gathered from smartphones or company events. Trip tracks can be displayed on top of the map and interactively dragged to adjust their exact position. The correlated images are displayed along the track and can be interactively dragged along the track to adjust their exact position to assign precise geo location information that can then be used in standard map views. The user has options for making the path stick to existing roads in the map, and to ignore certain GPS points coming from photos that are not desired in the path. The user can modify the path, and the locations of the images without GPS data are computed on-the-fly.

Figure 6D:
FIG. 6D is an example heatmap on a map view in accordance with some implementations.

In some implementations, heatmaps displayed on the map view 614 show location based information. FIG. 6D is an example heatmap illustrating the computation results of the tourists and locals in San Francisco. In FIG. 6D, based on metadata extracted from the images, some images are categorized as taken by tourists 644, while some images are categorized as taken by locals 642. Together with geo location information associated with each image, a heatmap as shown in FIG. 6D can be displayed on the map view 614 to show location based information such as the spots predominantly visited by tourists as opposed to visited by locals.

Referring back to FIG. 6A, when a single image is selected from the dashboard, the full metadata is displayed and the original image is displayed, if it is available. For locally stored or cloud-based images, the full resolution image is downloaded and cached, and for offline local storage, the full resolution image is requested via a secure asynchronous catalog transfer protocol in accordance with some implementations. If multiple variations of the same image exist, either exact duplicates, crops or color corrected variations of the same image, the system displays those on a timeline. This allows the viewer 124 to see all the locations where an image is stored, if it has been uploaded to social services (e.g. Facebook), and track the progress through a design sequence. Variations are detected using SIFT analysis as disclosed above and other structural image algorithms.

In some implementations, after performing the image analysis and uploading process as shown FIG. 5A, the server 108 receives a query from a second user (e.g., when a single image is selected from the dashboard 600 by a viewer 124), matches the query to a first index entry in the image catalog 114, wherein the first index entry corresponds to a first image in the first image database (e.g., the image database 123), determines whether the second user is authorized to view the first image, and when the second user is authorized to view the first image, the server 108 retrieves the first image from the first image database (e.g, the image database 123), and transmits the first image to the second user. FIG. 7 below illustrates the catalog transfer process in response to image requests in further details.

FIG. 7 illustrates a catalog transfer process 700 in accordance with some implementations. The catalog transfer is handled by modules such as the transfer module 226 and/or the transfer module 336 to provide a mechanism to route requests to the original source of an image, such as the original images stored in the image databases 123. In some implementations, the catalog transfer request protocol 700 is an encrypted communication mechanism that supports a broad set of authentication protocols (e.g. OAuth, SQL) implemented as plugin modules. Image specific data, including multiple resolution images (i.e. thumbnails) and EXIF metadata, is requested and delivered to client applications after successful authentication. All data is transmitted using advanced encryption (e.g., 256 bit AES) to prevent unauthorized interception. In some implementations, all data stored and transferred to the image catalog 114 is encrypted. Locally cached data is stored unencrypted by default in accordance with some implementations, though it can optionally be stored encrypted at the cost of performance. In some implementations, an industry standard 128 bit encryption, with an optional 1024 bit encryption, can be used for security. Once the server 108 receives the request from the viewer device 104, the server 108 notifies (712) the owner, the data manager 132 of the curator device 130.

Notifications display changes to the images and requests for action. For example, a user can watch a given file or any files that match a given search and receive notifications whenever those files are accessed or modified. The user can also receive notifications when images stored in a local repository on the user's system are requested by remote clients, and finally, notifications can be sent manually to a set of clients based on a variety of scoping mechanisms. Both the viewer application and the curator application display notifications using the standard mechanisms supported on their native platform 510. In addition to the in-app notification mechanisms, notifications can be sent via email. Emails can include the notification message, and optionally the associated URL and image files (assuming they are small enough).

One type of notification is a watch notification. In some implementations, user can request notifications for any search set in the navigator depicted in FIG. 6A. The search set is "dynamic" in that it represents any images that match the search criteria, even if new images are added to the portfolio after the notification watch is requested. The notification options allow the user to select whether notification is triggered when any image in the search set is accessed, modified, added or deleted. For example, the user can request notification any time any image with the tag #Schnauzer is modified so that nobody changes any of the pictures of the user's favorite pet.

Another type of notification is a manual notification. In some implementations, manual notifications can be sent to all people who have access, modified, added or removed images for a given search. This is similar to a watch notification except that the notification is triggered manually, rather than by any modification to the portfolio. Additionally, the notification is sent to anyone who matches the notification criteria, not just those people who have watched the images in the notification set. This can be useful as a workflow aid, to inform people when an image has moved from draft to final status, or when the images in the search set have been posted publicly.

A third type of notification is a transfer notification. In some implementations, a transfer request is issued any time someone requests (710) access to the pixels in a given image. Transfer requests automatically post notifications (712) to the client 132 that manages a given image, that is, the client 132 that was responsible for uploading the requested image metadata via the curator device 130. Transfer requests can be configured to be satisfied automatically via a customizable rule set, or the user can control access manually by forcing manual approval of the transfer request, providing an extra level of security.

In some implementations, special tags are used internally by for notifications. Each user or group that watches a given image is marked with an @<user> tag. Whenever the notification criteria are satisfied (e.g., if a user is monitoring changes and the image metadata is changed), the user watching the image is notified.

Still referring to FIG. 7, once the owner 132 approves (714) the transfer request, the requester 124 can be notified (716) to start the image download. During the download, the protocol SDK begins with an initial authentication request that provides access to a given image repository. Once authenticated, subsequent requests (718 and 720) use individual image URLs to retrieve pixel or metadata information. Each image can be interrogated to discover the versions and resolutions supported, and the pixel and metadata information can be requested separately for each version. Included modules that implement the transfer request protocol use the native SDKs for each database type (e.g. Dropbox, Flickr, Filemaker, etc.). In some implementations, the public SDK can be used to add support for other proprietary databases.

The system 100 relies on the native image database (e.g., the image database 123) to fulfill requests for the full-resolution image pixels. Since the native database (e.g., the image database 123) may be local, remote or offline, the assumption is that requests for the full image pixels may take a long time, even hours or days. In some implementations, the system tries to fulfill requests for image data, but, if not possible, a special return code can be sent indicating that the request may take longer and a notification can be sent when the data is available. After receiving a transfer notification, the pixel data can then be queried again, with a reasonably, though not guaranteed, assumption that the pixels can be returned in a few seconds. However, if the notification is not serviced within a specified time period (hours), the requester 124 may receive another notification in the pixel result block.

In some implementations, transfer requests are serviced immediately for local and online cloud storage (depending on security options). Offline storage requests are buffered and stored in the image catalog 114. Once offline storage becomes available, e.g. when the desktop attached to the storage goes online running either the curator or viewer application, a notification is sent (716) to the data manager 132 of the curator device 130, which then transfers (718) the pixels to the image catalog 114, where it is stored in a temporary container 702. Once the pixels are transferred (718), a second notification is sent to the original requester 124, who can then download (720) the pixels to the viewer device 104. If the original requestor 124 is not online, the second notification is buffered and re-sent once the original requestor 124 comes back online in accordance with some implementation. Once the pixels are downloaded by the original requestor 124, or if a request has been outstanding for more than a specified period (typically a few hours), the temporary container 702 residing on the image catalog 114 is released and the transfer requests must be performed again as needed.

The long latency of transfer requests demands special procedures in applications using the image catalog 114. They are prepared to use stand-in thumbnails and never expect to have fast access to the full-resolution image. The advantage is that the system can work with images that are offline or when the network is down, removing the requirement that all image databases be online and accessible for the app to run properly. Transfer requests thus enable the system to handle multiple databases (e.g., the image databases 123) with high security, including offline storage attached to local computing devices as opposed to high-reliability cloud services.

The curator and viewer applications described herein leverage a number of interrelated libraries to improve search. The libraries are used directly by the desktop and mobile application and a set of SDK modules, or can be accessed remotely via a REST API running on a server managing the image catalog 114 by web-based JavaScript apps in accordance with some implementations. In some implementations, all of the functions are asynchronous, returning results using a non-blocking API designed to support multi-threaded clients accessing data over the Internet with high latency. In some implementations, the set of SDK modules, Public SDK, described in more details below, can be used by customers to directly to extend the image catalog.

The image catalog 114 along with the modules to access and manage the image catalog 114 provides a management layer that makes multiple local or remote image repositories (e.g., the image databases 123) appear as a single, asynchronous repository. The image analysis library provides a collection of advanced image processing that can be used to extract information from images useful for search. The extracted information can be stored in the metadata 244. To facilitate the image search, the image search library further ranks and filters images managed by the image catalog 114.

Typical cloud databases assume that all the data is stored in a single container, accessible through a single authentication. Requiring a single repository means changing a user's workflow, creating duplicate copies of data, and increasing storage costs. For enterprise customers with a large collection of images (e.g., the Smithsonian Institution or a professional sports team) such workflow changes are disruptive.

In comparison, the disclosed implementations address these problems by constructing a lightweight database, orders of magnitude smaller than a typical image database, containing placeholders for each image, much like a card catalog does for a library. This lightweight database is decoupled from the geometrically increasing resolution and file size of image and video data (e.g., book contents), enabling it to scale to massive image collections at a very low storage cost (e.g., a small cabinet). Additionally, images may live in any location, allowing the user to group collections of images stored in separate repositories, avoiding duplication and workflow changes.

Disclosed implementations are image-centric. Images are a privileged file type on the Internet. Many social and cloud services treat images differently than generic files. They can be displayed, shared with others, and stored in many places that do not permit generic files. Images can contain metadata, which includes hidden text stored within the file that is not visible without specialized tools. Metadata is extensible and can contain any information useful to the app that created the image. Images are also resizable, with standard tools that provide smaller representations, thumbnails, of larger images. Images are typically quite large and their file sizes are growing geometrically. Cameras routinely generate 40-60 megapixel images which can easily take up 100 MB of storage space. Some implementations decouple these storage size issues by leveraging the image metadata and thumbnails to provide ways of transferring images around networks efficiently.

In some implementations, the Public SDK provides interfaces to extend the image catalog platform. Modules are provided to add new database types to the curator tool, export search results to external applications, provide domain-specific data and computed metadata fields to use during search. In some implementations, extension modules are written in the C/C++ and run inside of the curator and viewer applications. In some implementations, the Public SDK includes but not limited to a Portfolio SDK, an Export SDK, and a Domain Data SDK.

The Portfolio SDK enables addition of new image sources. Image source modules 222 and/or 332 provide authentication, inventory, access and modification methods that are used by the curator and viewer application. In some implementations, the Portfolio SDK provides curator modules for Flickr, Facebook, Google+, Dropbox, Box and many others. Custom portfolio modules can be added to access images stored in proprietary repositories. In order to access the images stored in source image repositories (e.g., images stored in image databases 123 on external services 122 such as Flickr, Facebook, Google+, Dropbox, Box and many others), the Portfolio SDK can include:

Overrides:
Open (URL)
Search(string, A(string, GUIDE[ ]))
GetThumbnail(GUID[ ], ^(GUID[ ], Thumbnail))
GetMetadataField(GUID[ ], field, ^(GUID[ ], field, value[ ])
SetMetadataField(GUID, field, value, ^(GUID, field, value, status))
RequestPixels(GUID, ^(GUID, pixels))

The Export SDK connects search results to external applications. It is invoked by the viewer application (e.g., the delivery module 440) to deliver image groups to a variety of services. In some implementations, the present disclosure provides export modules for Lightroom Collections, email, and Wordpress. The Export SDK can include:

Overrides:
Init( )
Export(Portfolio, GUTD[ ])
Finish( )

The Domain Data SDK converts proprietary files and spreadsheets into global or per-image metadata fields to aid in searching. For example, the user can import company calendars that identify events, or spreadsheets that contain per-image data not included in the original thumbnails. In some implementations, if the user has a custom database that contains image data, through Domain Data SDK, the user can parse and extract that data and add it to the metadata 244 stored in the image catalog 114.

In some implementations, global data is also used for suggested completions and tag selections. For example, if a department uses a specific workflow based around specific tag sets, or if the user likes to group the user's images into specific tag sets that may not exist on any image, the user can define global tags. In another example, the user can define a tag sets called "Workflow" with the tags {#Draft, #Eval, #Final}, or "Seasons" with {#Winter, #Spring, #Summer, #Fall}. The Domain Data SDK can include:

Overrides:
Init( )
bool Open(Portfolio, URL) Finish( )
Mutators:
Register(".ext; .typ")
SetGlobal (name, value)
MakeTag(name)

Figure 8A:
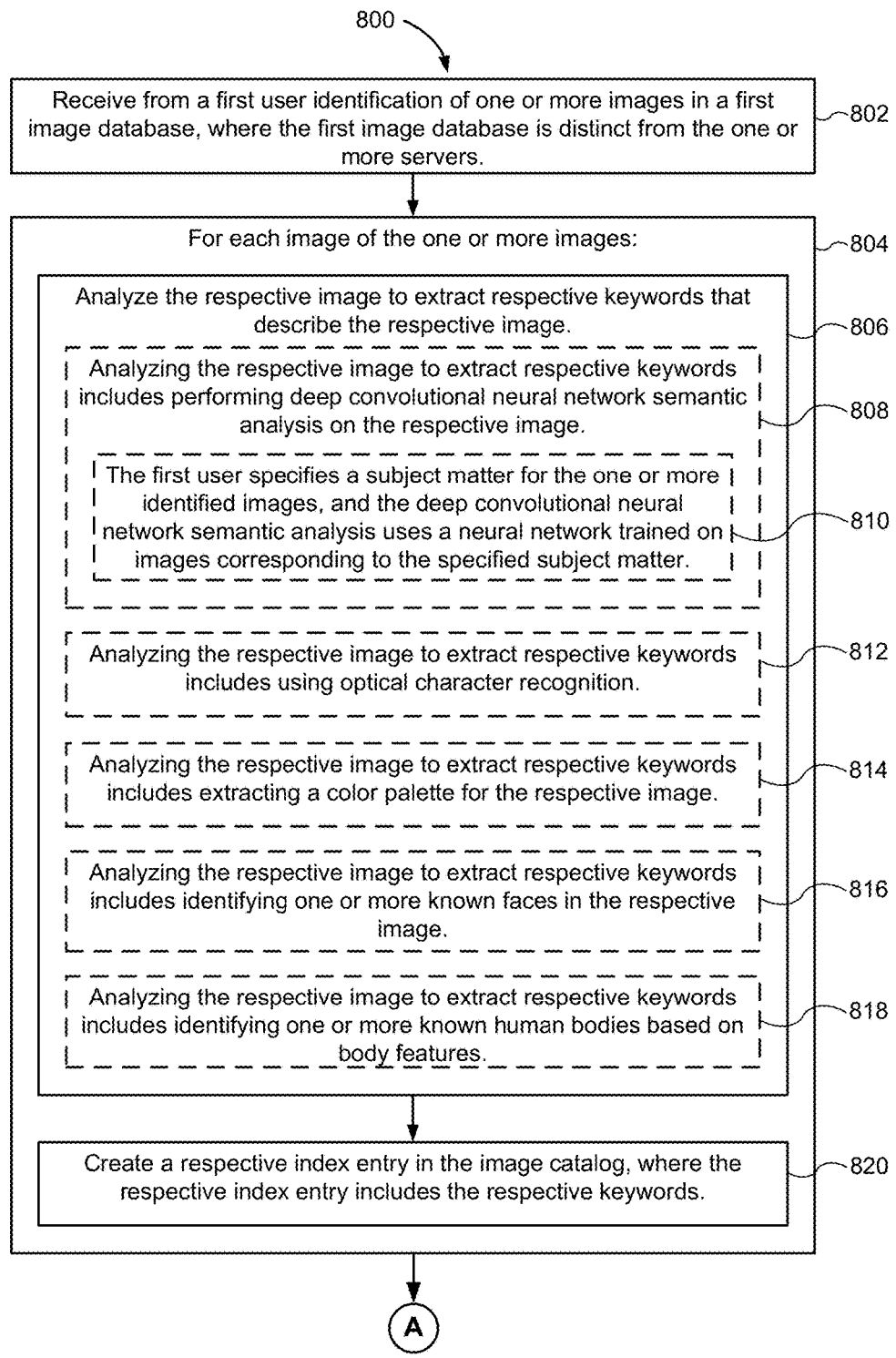
FIGS. 8A and 8B provide a flowchart of a process for managing an image catalog in accordance with some implementations.
Figure 8B:
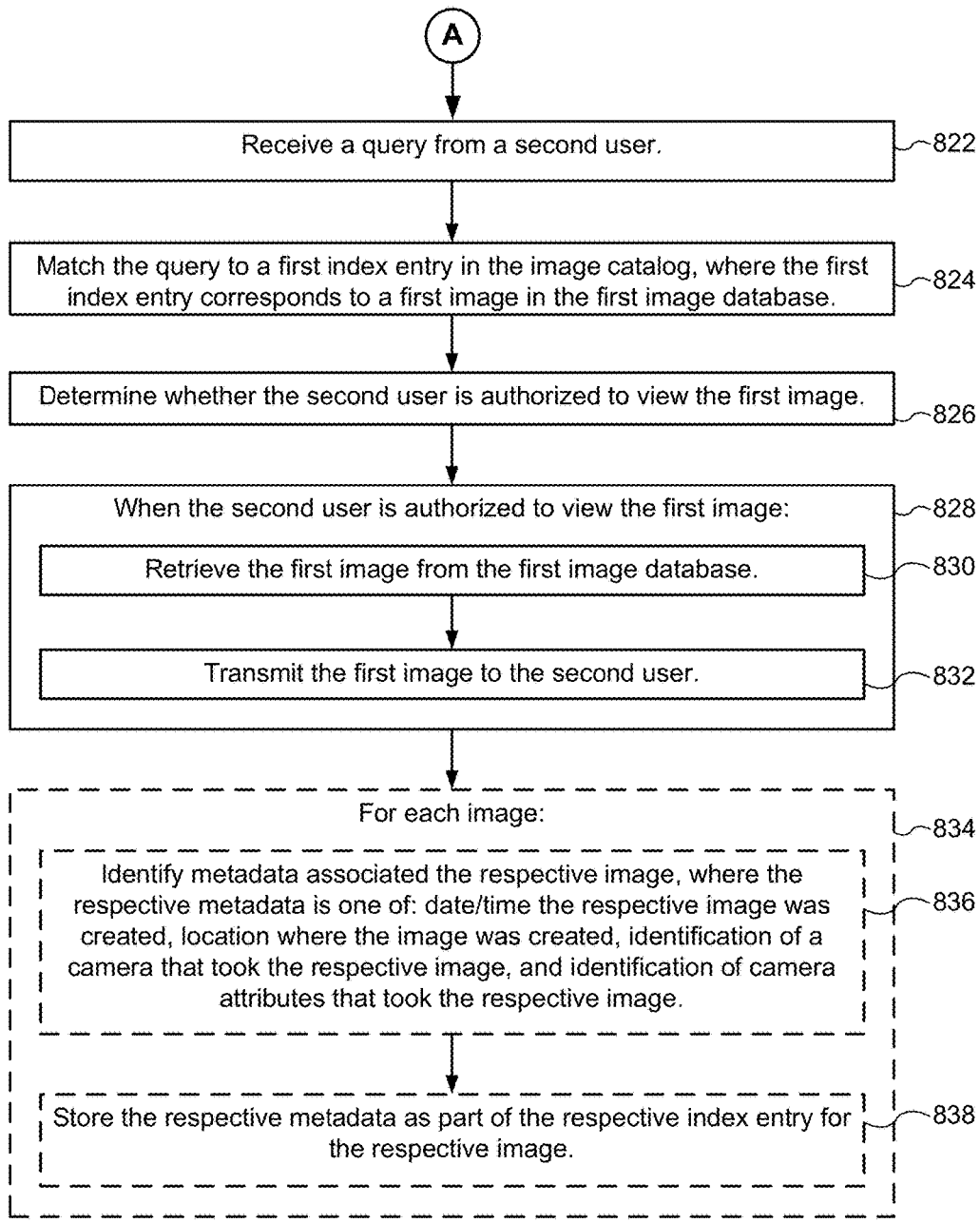

FIGS. 8A-8B illustrate a flowchart of a process 800 for managing an image catalog. In some implementations, the process 800 is performed by one or more servers (e.g., the server system 108, FIG. 1), each having one or more processors and memory.

The server system 108 receives (802) from a first user (e.g., the data manager 132, FIG. 1 and FIG. 5A) identification of one or more images in a first image database (e.g., the image database 123, FIG. 1). In some implementations, the first image database is distinct from the one or more servers. For example, as shown in FIG. 1, the image databases 123 can reside on one or more external services 122 that are distinct from the server system 108.

For each image of the one or more images (804), the server system 108 first analyzes (806) the respective image to extract respective keywords that describe the respective image. In some implementations, analyzing the respective image to extract respective keywords includes (808) performing deep convolutional neural network semantic analysis on the respective image. For example, as shown in FIG. 5C, an image of a waterfront sunset scene with clouds in the sky can be analyzed by performing deep convolutional neural network semantic analysis on the image, and keywords such as "sunset," "cloud," and "water" describing the image can be extracted and saved as tags.

In some implementations, the first user specifies (810) a subject matter for the one or more identified images, and the deep convolutional neural network semantic analysis uses a neural network trained on images corresponding to the specified subject matter. For example, during a training phase of the deep convolutional neural network semantic analysis, a user supplies images with sunset scenes and a subject matter keyword "sunset" to the deep convolutional neural network. The trained neural network can be then used in the deep convolutional neural network semantic analysis to recognize images with sunset scenes and produce keywords such as "sunset" as tags for the images.

As shown in FIG. 5A, in addition to or in conjunction with the deep convolutional neural network semantic analysis, other image analysis techniques such as OCR, color analysis, and facial and body recognition are also used to analyze the respective image and generate respective tags. In some implementations, analyzing the respective image to extract respective keywords includes (812) using optical character recognition (OCR), e.g., using OCR to extra logos, street signs, jersey numbers, or document text. In some implementations, analyzing the respective image to extract respective keywords also includes (814) extracting a color palette for the respective image, as illustrated in FIGS. 5D and 5E. In some implementations, analyzing the respective image to extract respective keywords includes (816) identifying one or more known faces in the respective image. In some implementations, analyzing the respective image to extract respective keywords includes identifying (818) one or more known human bodies based on body features (e.g., match facial and body features against a set of known geometries to generate names).

After analyzing the respective image, the server system 108 creates (820) a respective index entry in the image catalog, where the respective index entry includes the respective keywords, such as "sunset." The indexed image catalog can then be searched. In some implementations, through a user interface (e.g., the exemplary image portfolio dashboard as shown in FIG. 6A), the server system 108 receives (822) a query from a second user (e.g., the requester 124, FIG. 1 and FIG. 7). Upon receiving the query, the server system 108 matches (824) the query to a first index entry in the image catalog, where the first index entry corresponds to a first image in the first image database.

In some implementations, security is built into the process 800 as described above with respect to FIGS. 5 and 7. During catalog creation, an approval process is in place to allow only authorized uploads, and before returning search results to a requestor, the server system 108 authenticates the requestor and provides search results only to authorized users. In some implementations, upon receiving a search result, the server system 108 determines (826) whether the second user (e.g., the requester 124, FIGS. 1 and 7) is authorized to view the first image. When the second user is authorized to view the first image (828), the server system 108 retrieves (830) the first image from the first image database, and transmits (832) the first image to the second user. In some implementations, some of the files may not be immediately available upon request. For example, a file may be stored in offline local storage or by external services 122 that are briefly unavailable. When the requested files are not immediately available, the server system 108 can queue the request and schedule transfer of the files once they are available, such as when an offline storage medium or an external service 122 is back online.

In some implementations, in addition to the storing tags generated by image analysis, other metadata is also stored in the image catalog to facilitate searches. In some implementations, for each image (834), the server system 108 identifies (836) metadata associated the respective image. The metadata may include: a date/time the respective image was created; a location where the image was created; identification of a camera that took the respective image; and/or identification of camera attributes that took the respective image. The server system 108 stores (838) the metadata as part of the index entry for the respective image. This metadata can be used when displaying the image portfolio to a user or during a search. For example, the location where the image was created (e.g., GPS data) can be stored as metadata and/or as part of the location index entry for the image. During search, the location metadata can be used to generate a map view of images with a path computed using GPS data, as shown in FIG. 6C, or generate a heatmap to show popular spots where tourists take photos as opposed to where locals take photos, as shown in FIG. 6D.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of managing an image catalog, performed by one or more servers, each having one or more processors and memory, the method comprising:

receiving, by the one or more servers, reduced-resolution versions of one or more images, the one or more images stored in a first image database of an external service, wherein the first image database of the external service is distinct from the one or more servers;

for each respective image of the one or more images stored in the first image database of the external service:

analyzing, by the one or more servers, a reduced-resolution version of the respective image to extract respective keywords that describe the respective image; and creating, by the one or more servers, a respective index entry in the image catalog, wherein the respective index entry includes the respective keywords;

receiving, by the one or more servers, a query from user;

matching, by the one or more servers, the query to a first index entry in the image catalog, wherein the first index entry corresponds to a first image stored as a full-resolution version in the first image database;

transmitting, by the one or more servers to an owner of the first image, a request for authorization of the user to view the first image;

in accordance with a determination that the user is authorized to view the first image:

retrieving, by the one or more servers, the full-resolution version of the first image from the first image database of the external service;

temporarily storing, b the one or more servers, the full-resolution version of first image in a temporary storage of the one or more servers; and transmitting, by the one or more servers, the full-resolution version of the first image to the user, and releasing, by the one or more servers, the full-resolution version of the first image from the temporary storage in response to the transmitting the full-resolution version of the first image to the user.

2. The method of claim 1, wherein the analyzing of the respective image to extract the respective keywords comprises performing deep convolutional neural network semantic analysis on the respective image.

3. The method of claim 2, further comprising receiving a specified subject matter for the one or more images, wherein the deep convolutional neural network semantic analysis uses a neural network trained on images corresponding to the specified subject matter.

4. The method of claim 1, wherein the analyzing of the respective image to extract the respective keywords comprises using optical character recognition.

5. The method of claim 1, wherein the analyzing of the respective image to extract the respective keywords comprises extracting a color palette for the respective image.

6. The method of claim 1, wherein the analyzing of the respective image to extract the respective keywords comprises identifying one or more known faces in the respective image.

7. The method of claim 1, wherein the analyzing of the respective image to extract the respective keywords comprises identifying one or more known human bodies based on body features.

8. The method of claim 1, further comprising for each respective image:

identifying metadata associated the respective image, wherein the respective metadata is selected from the group consisting of date or time when the respective image was created, location where the respective image was created, identification of a camera that took the respective image, and identification of camera attributes that took the respective image; and storing the respective metadata as part of the respective index entry for the respective image.

9. A computer system for managing an image catalog, comprising:

one or more processors;

a memory; and one or more programs stored in the memory and configured for execution by the one or more processors, the one or more programs comprising instructions for:

receiving, by the computer system, reduced-resolution versions of one or more images, the one or more images stored in a first image database of an external service, wherein the first image database of the external service is distinct from the computer system;

for each respective image of the one or more images stored in the first image database of the external service:

analyzing, by the computer system, a reduced-resolution version of the respective image to extract respective keywords that describe the respective image; and creating, by the computer system, a respective index entry in the image catalog, wherein the respective index entry includes the respective keywords;

receiving, by the computer system, a query from user;

matching, by the computer system, the query to a first index entry in the image catalog, wherein the first index entry corresponds to a first image stored as a full-resolution version in the first image database;

transmitting, by the computer system to an owner of the first image, a request for authorization of the user to view the first image;

in accordance with a determination that the user is authorized to view the first image:

retrieving, by the computer system, the full-resolution version of the first image from the first image database of the external service;

temporarily storing, by the computer system, the full-resolution version of first image in a temporary storage of the computer system; and transmitting, by the computer system, the full-resolution version of the first image to the second user, and releasing, by the computer system, the full-resolution version of the first image from the temporary storage in response to the transmitting the full-resolution version of the first image to the user.

10. The computer system of claim 9, wherein the analyzing of the respective image to extract the respective keywords comprises performing deep convolutional neural network semantic analysis on the respective image.

11. The computer system of claim 9, wherein the analyzing of the respective image to extract the respective keywords comprises using optical character recognition.

12. The computer system of claim 9, wherein the analyzing of the respective image to extract the respective keywords comprises extracting a color palette for the respective image.

13. The computer system of claim 9, wherein the analyzing of the respective image to extract the respective keywords comprises identifying one or more known faces in the respective image.

14. The computer system of claim 9, wherein the analyzing of the respective image to extract the respective keywords comprises identifying one or more known human bodies based on body features in the respective image.

15. The computer system of claim 9, wherein the one or more programs further comprising instructions that execute for each respective image for:

identifying metadata associated the respective image, wherein the respective metadata is selected from the group consisting of date or time when the respective image was created, location where the respective image was created, identification of a camera that took the respective image, and identification of camera attributes that took the respective image; and storing the respective metadata as part of the respective index entry for the respective image.

16. A non-transitory computer readable storage medium storing one or more programs configured for execution by one or more processors of a computer system for managing an image catalog, the one or more programs comprising instructions for:
- receiving, by the computer system, reduced-resolution versions of one or more images, the one or more images stored in a first image database of an external service, wherein the first image database of the external service is distinct from the computer system;
- for each respective image of the one or more images stored in the first image database of the external service:
  - analyzing, by the computer system, a reduced-resolution version of the respective image to extract respective keywords that describe the respective image; and
  - creating, by the computer system, a respective index entry in the image catalog, wherein the respective index entry includes the respective keywords;
- receiving, by the computer system, a query from user;
- matching, by the computer system, the query to a first index entry in the image catalog, wherein the first index entry corresponds to a first image stored as a full-resolution version in the first image database;
- transmitting, by the computer system to an owner of the first image, a request for authorization of the user to view the first image;
- in accordance with a determination that the user is authorized to view the first image:
  - retrieving, by the computer system, the full-resolution version of the first Image from the first image database of the external service;
  - temporarily storing, by the computer system, the full-resolution version of first image in a temporary storage of the computer system; and
  - transmitting, by the computer system, the full-resolution version of the first image to the second user, and
  - releasing, by the computer system, the full-resolution version of the first image from the temporary storage in response to the transmitting the full-resolution version of the first image to the user.

17. The non-transitory computer readable storage medium of claim 16, wherein the analyzing of the respective image to extract the respective keywords comprises at least one of:
- performing deep convolutional neural network semantic analysis on the respective image, using optical character recognition, extracting a color palette for the respective image, identifying one or more known faces in the respective image, or identifying one or more known human bodies based on body features.

18. The non-transitory computer readable storage medium of claim 17, further comprising receiving a specified subject matter for the one or more images, wherein the deep convolutional neural network semantic analysis uses a neural network trained on images corresponding to the specified subject matter.

19. The non-transitory computer readable storage medium of claim 16, wherein the one or more programs further comprising instructions that execute for each respective image for:
- identifying metadata associated the respective image, wherein the respective metadata is selected from the group consisting of date or time when the respective image was created, location where the respective image was created, identification of a camera that took the respective image, and identification of camera attributes that took the respective image; and
- storing the respective metadata as part of the respective index entry for the respective image.

20. The non-transitory computer readable storage medium of claim 16, wherein the retrieving of the first image from the first image database includes:
- retrieving the first image from an offline storage medium when the offline storage medium is back online.

* * * * *

UNITED STATES PATENT AND TRADEMARK OFFICE
CERTIFICATE OF CORRECTION

PATENT NO. : 10,318,575 B2  
APPLICATION NO. : 14/941502  
DATED : June 11, 2019  
INVENTOR(S) : Wexler et al.

Page 1 of 1

It is certified that error appears in the above-identified patent and that said Letters Patent is hereby corrected as shown below:

In the Claims

Claim 1, Column 28, Line 67, delete "from user" and insert --from a user--;

Claim 8, Column 29, Line 47, delete "associated the" and insert --associated with the--;

Claim 9, Column 30, Line 14, delete "from user" and insert --from a user--;

Claim 15, Column 30, Line 59, delete "associated the" and insert --associated with the--;

Claim 16, Column 31, Line 21, delete "from user" and insert --from a user--;

Claim 19, Column 32, Line 24, delete "associated the" and insert --associated with the--.

Signed and Sealed this  
Twentieth Day of August, 2019

Andrei Iancu  
*Director of the United States Patent and Trademark Office*